(12) United States Patent
Park et al.

(10) Patent No.: US 11,171,765 B2
(45) Date of Patent: Nov. 9, 2021

(54) SYSTEM AND METHOD FOR INDICATING PREEMPTION OF TRANSMISSIONS

(71) Applicant: QUALCOMM Incorporated, San Diego, CA (US)

(72) Inventors: Jeonghun Park, San Diego, CA (US); Jay Kumar Sundararajan, San Diego, CA (US); Chih-Ping Li, San Diego, CA (US); Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 16/275,241

(22) Filed: Feb. 13, 2019

(65) Prior Publication Data

US 2019/0253232 A1 Aug. 15, 2019

Related U.S. Application Data

(60) Provisional application No. 62/631,341, filed on Feb. 15, 2018.

(51) Int. Cl.
*H04L 5/14* (2006.01)
*H04W 72/04* (2009.01)
(Continued)

(52) U.S. Cl.
CPC .......... *H04L 5/1407* (2013.01); *H04W 40/08* (2013.01); *H04W 52/34* (2013.01); *H04W 72/0406* (2013.01)

(58) Field of Classification Search
CPC ................ H04W 40/08; H04W 52/34; H04W 72/0406; H04W 72/0446; H04L 5/1415
See application file for complete search history.

(56) References Cited

U.S. PATENT DOCUMENTS

2018/0035459 A1* 2/2018 Islam .................... H04W 74/04
2018/0191470 A1* 7/2018 Manolakos ........... H04W 72/12
(Continued)

OTHER PUBLICATIONS

Fujitsu: "Discussion on Preemption Indicator for Multiplexing eMBB and URLLC in Downlink", 3GPP Draft; R1-1701920 Preemption Based Multiplexing for EMBB and URLLC, 3rd Generation Partnership Project (3GPP), Mobile Competence Centre; 650, Route Des Lucioles; F-06921, Sophia-Antipolis Cedex; France, vol. RAN WG1, No. Athens. Greece; Feb. 13, 2017-Feb. 17, 2017 Feb. 12, 2017, XP051209082, Retrieved from the Internet: URL: http://www.3gpp.org/ftp/Meetings_3GPP_SYNC/RAN1/Docs/ [retrieved on Feb. 12, 2017], 5 pages.

(Continued)

*Primary Examiner* — Diane L Lo
*Assistant Examiner* — Abusayeed M Haque
(74) *Attorney, Agent, or Firm* — Qualcomm Incorporated

(57) ABSTRACT

In an aspect of the disclosure, a method, a computer-readable medium, and an apparatus are provided. In certain configurations, the apparatus may include an eMBB UE. The apparatus may monitor a single preconfigured mini-slot in each of a plurality of slots for a PI. The apparatus may receive the PI in the single preconfigured mini-slot of a first slot of the plurality of slots. In certain aspects, the PI may include a resource index associated with a reduced transmission power by the UE. In certain other aspects, the resource index may include one or more resources in a second slot. The apparatus may transmit at least one packet with the reduced transmission power on the one or more resources in the second slot or refraining from transmitting the at least one packet on the one or more resources in the second slot.

20 Claims, 11 Drawing Sheets

(51) Int. Cl.
*H04W 40/10* (2009.01)
*H04W 52/48* (2009.01)
*H04W 52/34* (2009.01)
*H04W 40/08* (2009.01)

(56) References Cited

U.S. PATENT DOCUMENTS

| | | | | |
|---|---|---|---|---|
| 2019/0174440 | A1* | 6/2019 | Kwak | H04W 56/0015 |
| 2019/0327757 | A1* | 10/2019 | Oteri | H04L 5/0053 |
| 2019/0349795 | A1* | 11/2019 | Park | H04W 24/08 |
| 2019/0349960 | A1* | 11/2019 | Li | H04W 72/1242 |
| 2019/0387550 | A1* | 12/2019 | Pan | H04L 5/0094 |
| 2020/0021419 | A1* | 1/2020 | Taherzadeh Boroujeni | H04L 5/0091 |
| 2020/0022160 | A1* | 1/2020 | Zou | H04W 72/1242 |
| 2020/0052811 | A1* | 2/2020 | Li | H04L 5/0007 |
| 2020/0221444 | A1* | 7/2020 | Tiirola | H04L 1/1812 |
| 2020/0260418 | A1* | 8/2020 | Xue | H04W 72/0446 |
| 2020/0267667 | A1* | 8/2020 | MolavianJazi | H04W 72/042 |
| 2020/0313836 | A1* | 10/2020 | Kang | H04W 72/12 |
| 2020/0336957 | A1* | 10/2020 | Wu | H04W 36/08 |
| 2020/0343981 | A1* | 10/2020 | Garcia | H04B 17/336 |

OTHER PUBLICATIONS

Intel Corporation: "Uplink Multiplexing of eMBB/URLLC Transmissions," 3GPP Draft; R1-1702241 Intel—URLLC_EMBB_MUX_UL, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051209399, 8 pages, Retrieved from the Internet: URL: http://www.3gpp.org/ftp/Meetings_3GPP_SYNC/RAN1/Docs/ [retrieved on Feb. 13, 2017].

International Search Report and Written Opinion—PCT/US2019/018045—ISA/EPO—dated May 15, 2019.

Qualcomm Incorporated: "URLLC/eMBB Downlink Dynamic Multiplexing Schemes", 3GPP Draft ; R1-1700827, 3rd Generation Partnership Project (3GPP), Mobile Competence Centre ; 650, Route Des Lucioles ; F-06921 Sophia-Antipolis Cedex ; France, vol. RAN WG 1 , No. Spokane, Wa; Jan. 16, 2017-Jan. 20, 2017 Jan. 16, 2017 (Jan. 16, 2017), XP051208346, Retrieved from the Internet: URL: http://www.3gpp.org/ftp/Meetings_3GPP_SYNC/RAN1/Docs/ [retrieved on Jan. 16, 2017].

Sequans Communications: "On Dynamic Resource Sharing Between URLLC and eMBB in DL", 3GPP Draft ; R1-1700642—On Dynamic DL Resource Sharing Between URLLC and EMBB, 3rd Generation Partnership Project (3GPP), Mobile Competence Centre ; 650, Route Des Lucioles ; F-06921 Sophia-Antipolis, vol. RAN WG 1, No. Spokane, USA; Jan. 16, 2017-Jan. 20, 2017 Jan. 16, 2017 (Jan. 16, 2017), [retrieved on Jan. 16, 2017]. XP051208167, Retrieved from the Internet: URL:http://www.3gpp.org/ftp/Meetings_3GPP_SYNC/RAN1/Docs/.

* cited by examiner

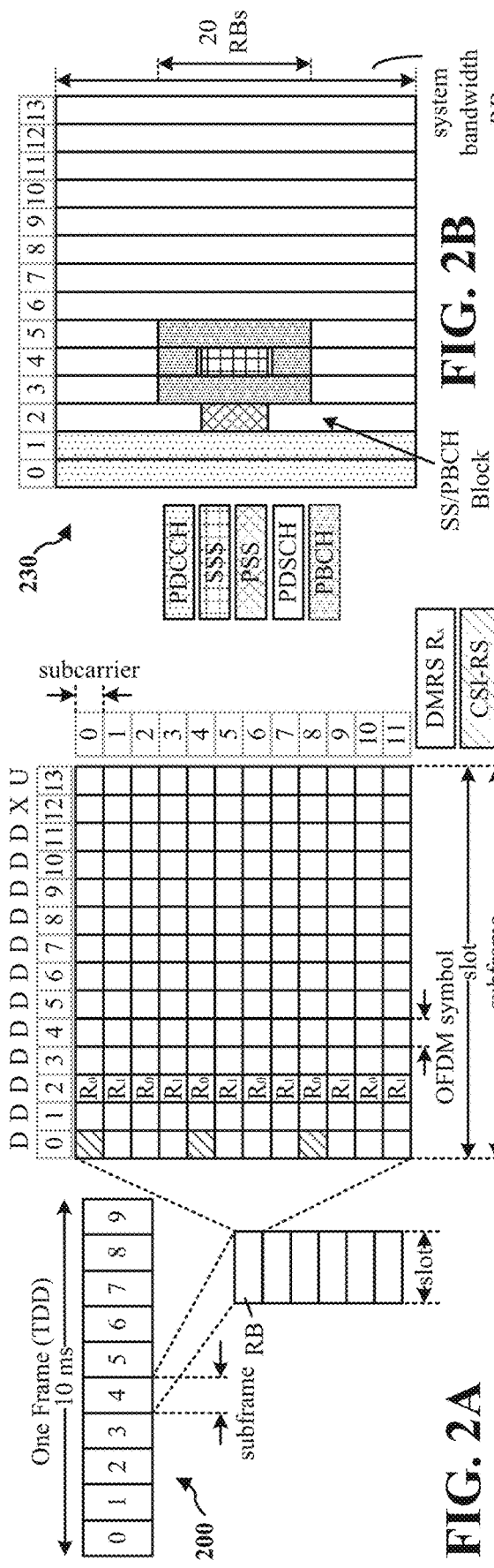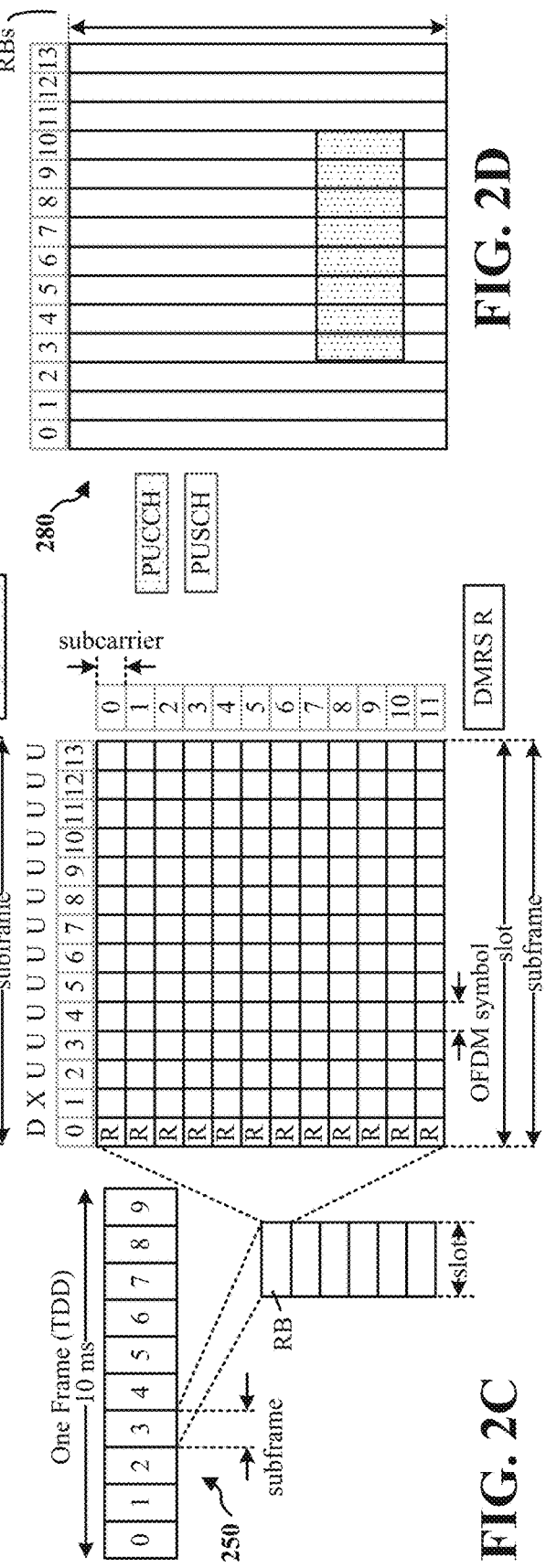

```
                                          ┌─ 602
  ┌──────────────────────────────────────┴─────────────────────────────────┐
  │ initiate a generation of the at least one packet for transmission on   │
  │ one or more resources in a second slot prior to receiving a PI in a    │
  │ single preconfigured mini-slot of a first slot                         │
  └────────────────────────────────┬───────────────────────────────────────┘
                                   │
                                   ▼    ┌─ 604
  ┌──────────────────────────────────────────────────────────────────────┐
  │ monitor the single preconfigured mini-slot in each of the plurality  │
  │ of slots for the PI                                                  │
  └────────────────────────────────┬─────────────────────────────────────┘
                                   ▼    ┌─ 606
  ┌──────────────────────────────────────────────────────────────────────┐
  │ receive the PI in the single preconfigured mini-slot of the first slot│
  │ of the plurality of slots                                            │
  └────────────────────────────────┬─────────────────────────────────────┘
                                   ▼    ┌─ 608
  ┌──────────────────────────────────────────────────────────────────────┐
  │ decode the PI received in the single preconfigured mini-slot of the  │
  │ first slot of the plurality of slots to obtain the resource index    │
  │ associated with the reduced transmission power                       │
  └────────────────────────────────┬─────────────────────────────────────┘
                                   ▼    ┌─ 610
  ┌──────────────────────────────────────────────────────────────────────┐
  │ perform power reduction of the at least one packet upon              │
  │ obtaining the resource index associated with the reduced             │
  │ transmission power from the decoding of the PI                       │
  └────────────────────────────────┬─────────────────────────────────────┘
                                   ▼    ┌─ 612
  ┌──────────────────────────────────────────────────────────────────────┐
  │ transmit at least one packet with the reduced transmission power     │
  │ on the one or more resources in the second slot or refrain from      │
  │ transmitting the at least one packet on the one or more resources    │
  │ in the second slot                                                   │
  └──────────────────────────────────────────────────────────────────────┘
```

FIG. 6

SYSTEM AND METHOD FOR INDICATING PREEMPTION OF TRANSMISSIONS

CROSS REFERENCE TO RELATED APPLICATION(S)

This application claims the benefit of U.S. Provisional Application Ser. No. 62/631,341, entitled "PREEMPTION INDICATOR TRANSMISSION" and filed on Feb. 15, 2018, which is expressly incorporated by reference herein in its entirety.

BACKGROUND

Technical Field

The present disclosure relates generally to communication systems, and more particularly, to a wireless communications system in which a preemption indicator is transmitted.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain implementations for 5G NR technology may include "Enhanced mobile broadband" (eMBB) that addresses person-centric use cases for access to multimedia content, services, and data. Certain other implementations for 5G NR may include "Ultra-reliable low-latency communications" (URLLC) with strict conditions in terms of latency and reliability.

For eMBB implementation, the achievable data rate (e.g., >100 Mbit/s in urban and suburban areas, and >1 Gbit/s in indoor cases) that is available within the target coverage area has the highest importance. For URLLC implementations, low latency (e.g., ms level) and reliability (e.g., 99.999% packet delivery) together with zero mobility interruption gap are of highest importance, e.g., in order to connect cars, drones, or mobile service robots.

The concurrent transmission (e.g., multiplexing) of eMBB packets and URLLC packets may be supported within the 5G NR network in order to support more users in the same uplink (UL) transmission time interval (TTI) (e.g., 2-symbol mini-slot, 14-symbol slot, etc.), and hence, make efficient use of the time and/or frequency resources. In scenarios in which URLLC packets and eMBB packets are transmitted concurrently, the network may prioritize the URLLC packets over the eMBB packets in order to achieve the stringent latency and reliability conditions for URLLC.

In such a scenario, a URLLC user equipment (UE) may implicitly and/or explicitly inform the base station that a URLLC packet will be transmitted using certain time and/or frequency resources. The base station may send a preemption indicator (PI) that includes a resource index of the time and/or frequency resources that will be used for URLLC packet transmission to one or more eMBB UEs.

Based on the resource index, the eMBB UE(s) may reduce the transmission power of any eMBB packet(s) (e.g., URLLC puncturing) scheduled for transmission using the same time and/or frequency resources as the URLLC packet in order to reduce the amount of interference caused to the URLLC packets, and hence, increase the chance that the base station will be able to properly decode the URLLC packet.

Because an eMBB UE may not know when the base station is sending a PI, the eMBB UE may need to monitor every mini-slot in order to provide reliable URLLC puncturing. However, while an eMBB UE that monitors every mini-slot may be able to provide reliable URLLC puncturing, such an eMBB UE may consume an undesirable amount of battery power monitoring for a PI. Thus, there is a need for a mechanism that reduces the amount of battery power consumed by an eMBB UE while monitoring for PIs.

The present disclosure provides a solution using slot-based PI transmission in which the base station transmits a PI using a preconfigured mini-slot in each slot. The eMBB UE(s) within the network may receive an indication (e.g., via RRC singling, preconfigured information, etc.) of which mini-slot in each slot will be used for PI transmission. Monitoring a single mini-slot in each slot rather than every mini-slot may reduce the amount of battery power consumed while monitoring for PIs. Because the duration of an eMBB packet generation procedure is longer that of a preemption procedure (e.g., transmit power reduction), even when the PI is received after an eMBB initiates eMBB packet generation, URLLC puncturing may still be achieved by the eMBB UE.

In an aspect of the disclosure, a method, a computer-readable medium, and an apparatus are provided. In certain configurations, the apparatus may include an eMBB UE. The apparatus may monitor a single preconfigured mini-slot in each of a plurality of slots for a PI. The apparatus may receive the PI in the single preconfigured mini-slot of a first slot of the plurality of slots. In certain aspects, the PI may include a resource index associated with a reduced transmission power by the UE. In certain other aspects, the resource index may include one or more resources in a second slot. The apparatus may transmit at least one packet with the reduced transmission power on the one or more resources in the second slot or refrain from transmitting the at least one packet on the one or more resources in the second slot.

In one aspect, the apparatus may further decode the PI received in the single preconfigured mini-slot of the plurality of slots to obtain the resource index associated with the reduced transmission power, and perform power reduction of the at least one packet upon obtaining the resource index associated with the reduced transmission power from the decoding of the PI. The reduced transmission power may be preconfigured at the UE. In one aspect, a first time period associated with the decoding the PI and the performing the power reduction is less than an entire slot duration.

In one aspect, the apparatus may further initiate generation of the at least one packet for transmission on the one or more resources in the second slot prior to the receiving the PI in the single preconfigured mini-slot of the first slot, and a second time period associated with the generation of the at least one packet may be longer than the first time period associated with the decoding the PI and the performing the power reduction, and the generation of the at least one packet may be initiated in a third slot that is located before the first slot and the second slot in a time domain. In one aspect, the plurality of slots may be associated with a frequency division duplex (FDD) configuration. In another aspect, the plurality of slots may be associated with a time division duplex (TDD) configuration. In one aspect, the apparatus may remain in a non-monitoring state in all mini-slots other than the single preconfigured mini-slot in each of the plurality of slots.

In another aspect of the disclosure, another method, another computer-readable medium, and another apparatus are provided. In certain configurations, the apparatus may include a base station. The apparatus may receive information from a first UE indicating the first UE will transmit a first URLLC packet. The apparatus may transmit a PI in a single preconfigured mini-slot in a first slot to at least one second UE for the first URLLC packet, and the PI may indicate a resource index associated with a reduced transmission power by the at least one second UE, and the resource index may include one or more resources in a second slot.

In one aspect, the information include a URLLC request indicating that the first URLLC packet will be transmitted by the first UE. The apparatus may further receive the first URLLC packet on the one or more resources in the second slot, and the information may be a second URLLC packet received prior to receiving the first URLLC packet from the first UE. In one aspect, the apparatus may further receive a multi-user transmission from the first UE and the second at least one second UE, and the multi-user transmission may include the first URLLC packet from the first UE and at least one eMBB packet from the at least one second UE, and the at least one eMBB packet may be received with the reduced transmission power as compared to a different multi-user transmission that does not include the first URLLC packet.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 6 is a flowchart of a method of wireless communication.

DETAILED DESCRIPTION

Figure 1:
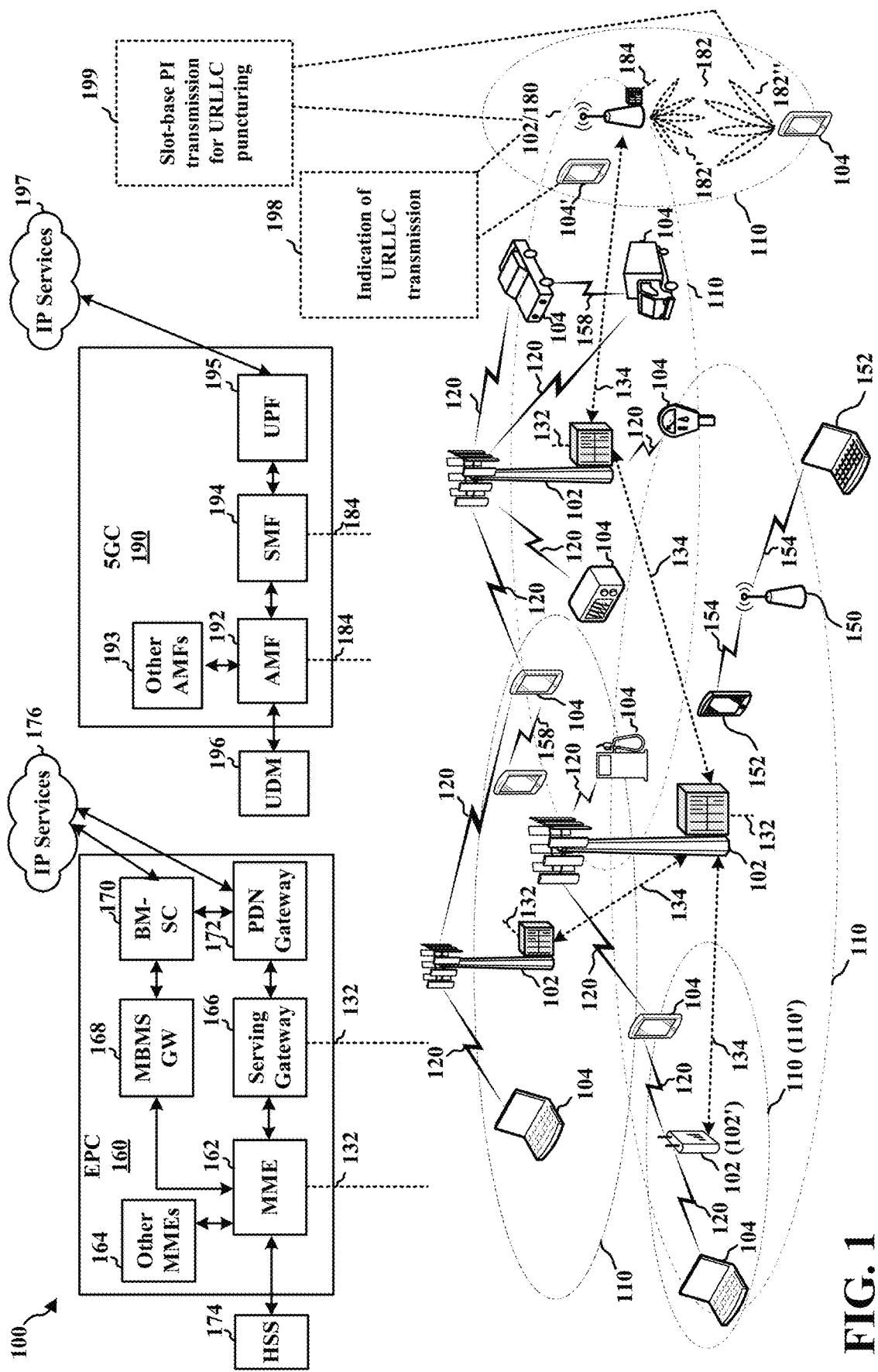
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G New Radio (NR), the concepts described herein may be applicable to other similar areas, such as LTE, LTE-A, Code Division Multiple Access (CDMA), Global System for Mobile communications (GSM), and/or other wireless/radio access technologies. Referring again to FIG. 1, in certain aspects, the base station 102/180 may receive, from a first UE 104', information indicating that the first UE 104' will transmit a first ultra-reliable low-latency communications (URLLC) packet (198). The first UE 104' may be configured for URLLC, and may be referred to as a URLLC UE.

The base station 102/180 may transmit a preemption indicator (PI) in a single preconfigured mini-slot in a first slot to at least one second UE 104 for the first URLLC packet (199). The at least one second UE 104 may be configured for enhanced mobile broadband (eMBB), and may be referred to as an eMBB UE. The PI may indicate a resource index associated with a reduced transmission power by at least the second UE 104, and the indicated the resource index may include one or more sources in a second slot.

The second UE 104 may monitor a single preconfigured mini-slot in each of a plurality of slots for a PI. The second UE 104 may receive, from the base station 102/180, the PI in the single preconfigured mini-slot of a first slot of the plurality of slots (199). As indicated, the PI may include a resource index associated with a reduced transmission power by the second UE 104, and the resource index may include one or more resources in a second slot. The second UE 104 may transmit at least one packet with the reduced transmission power on the one or more resources in the second slot or refrain from transmitting the at least one packet on the one or more resources in the second slot based on the PI.

The information from the first UE 104' indicating that the first UE 104' will transmit a first URLLC packet (198), and the transmission of the PI in a single preconfigured mini-slot in a first slot to at least one second UE 104 for the first URLLC packet (199), may be described herein with respect to FIGS. 2A-11. Additional and/or alternative aspects may also be described herein with respect to FIGS. 2A-11.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
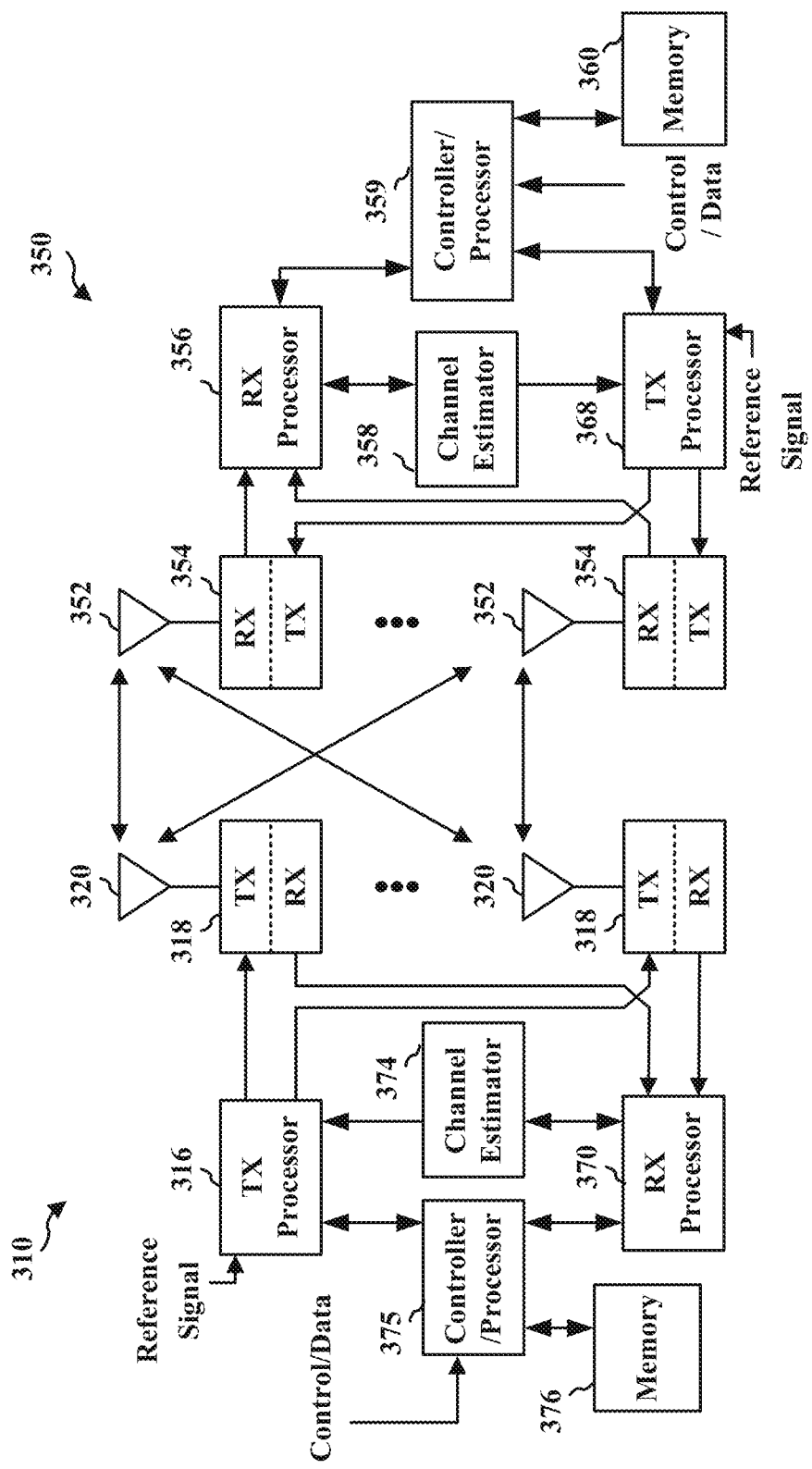
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal.

The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Certain implementations for 5G NR technology may include eMBB that addresses person-centric use cases for access to multimedia content, services and data. Certain other implementations for 5G NR may include URLLC with strict requirements in terms of latency and reliability.

For eMBB implementations, the achievable data rate (e.g., >100 Mbit/s in urban and suburban areas, and >1 Gbit/s in indoor cases) that is available within the target coverage area has the highest importance. For URLLC implementations, low latency (e.g., ms level) and reliability (e.g., 99.999% packet delivery) together with zero mobility interruption gap are of highest importance, e.g., in order to connect cars, drones, or mobile service robots.

The concurrent transmission (e.g., multiplexing) of eMBB packets and URLLC packets may be supported within the 5G NR network in order to support more users in the same UL TTI (e.g., 2-symbol mini-slot, 14-symbol slot, etc.), and hence, make efficient use of the time and/or frequency resources. In scenarios in which URLLC packets and eMBB packets are transmitted concurrently, the network may prioritize the URLLC packets over the eMBB packets in order to achieve the stringent latency and reliability conditions for URLLC.

In such a scenario, a URLLC UE may implicitly and/or explicitly inform the base station that a URLLC packet will be transmitted using certain time and/or frequency resources. The base station may send a PI that includes a resource index of the time and/or frequency resources that will be used for URLLC packet transmission to one or more eMBB UEs.

Based on the resource index, the eMBB UE(s) may reduce the transmission power of any eMBB packet(s) (e.g., URLLC puncturing) scheduled for transmission using the same time and/or frequency resources as the URLLC packet in order to reduce the amount of interference caused to the URLLC packets, and hence, increase the chance that the base station will be able to properly decode the URLLC packet.

Because an eMBB UE may not know when the base station is sending a PI, the eMBB UE may need to monitor every mini-slot in order to provide reliable URLLC puncturing. However, while an eMBB UE that monitors every mini-slot may be able to provide reliable URLLC puncturing, such an eMBB UE may consume an undesirable amount of battery power monitoring for a PI. Thus, there is a need for a mechanism that reduces the amount of battery power consumed by an eMBB UE while monitoring for PIs.

The present disclosure provides a solution using slot-based PI transmission in which the base station transmits a PI using a preconfigured mini-slot in each slot, e.g., as described below in connection with any of FIGS. 4-11. The eMBB UE(s) within the network may receive an indication (e.g., via RRC singling, preconfigured information, etc.) of which mini-slot in each slot will be used for PI transmission. Monitoring a single mini-slot in each slot rather than every mini-slot may reduce the amount of battery power consumed while monitoring for PIs. Because the duration of an eMBB packet generation procedure is longer that of a preemption procedure (e.g., transmit power reduction), even when the PI is received after an eMBB initiates eMBB packet generation, URLLC puncturing may still be achieved by the eMBB UE.

Figure 4:
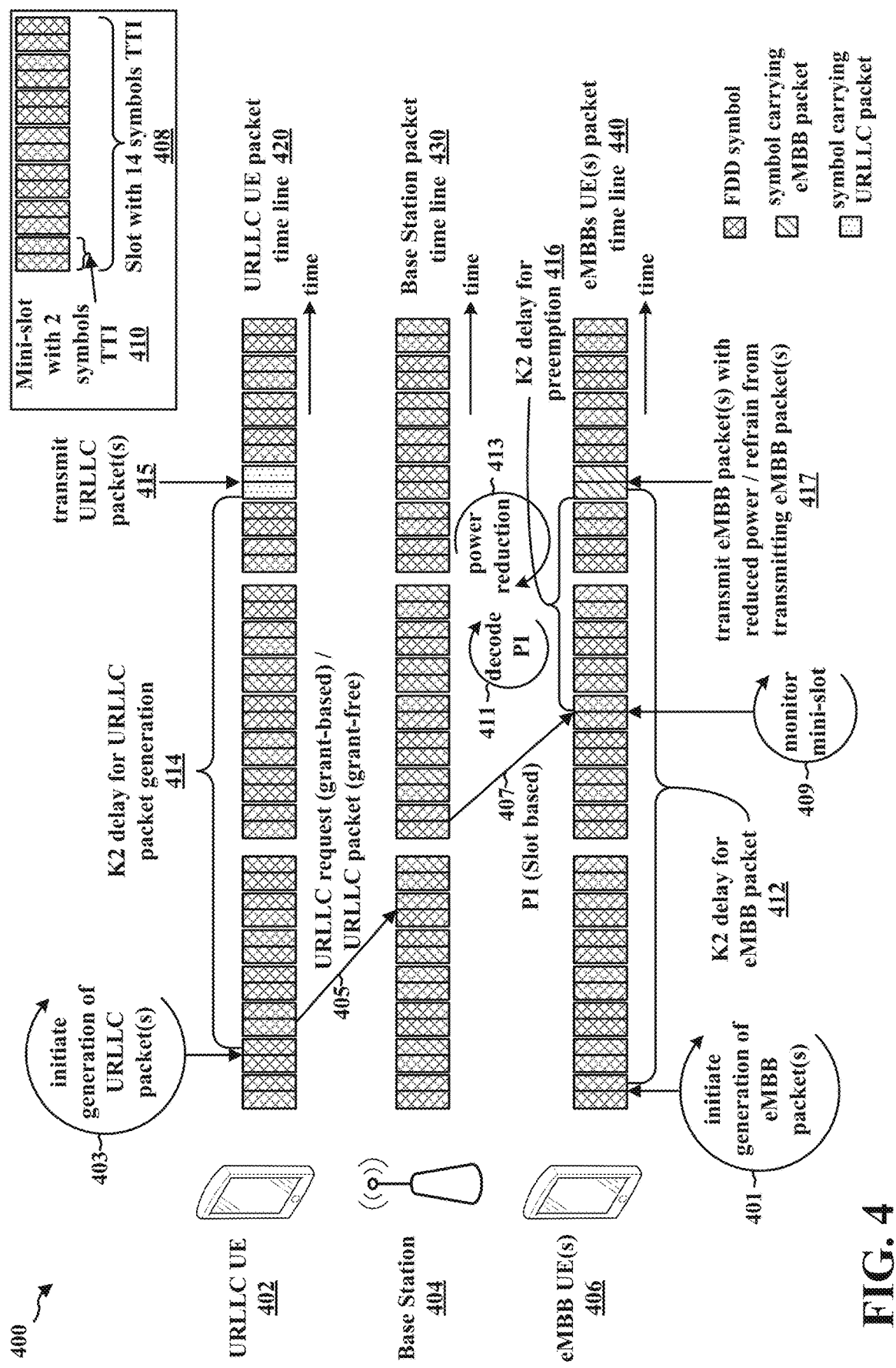
FIG. 4 is a diagram illustrating a wireless communication system that may be used for slot-based preemption indicator (PI) transmission in accordance with certain aspects of the disclosure.

FIG. 4 is a diagram illustrating a wireless communication system 400 that may be used for slot-based PI transmission in accordance with certain aspects of the disclosure. The wireless communication system 400 may include a URLLC UE 402, a base station 404, and at least one eMBB UE 406. The URLLC UE 402 may correspond to, e.g., the UE 104 (first UE 104'), UE 350, URLLC UE 502, and/or first UE 1050. The base station 404 may correspond to, e.g., the base station 102/180, base station 310, base station 504, base station 750, and/or the apparatus 1002/1002'. The at least one eMBB UE 406 may correspond to, e.g., the UE 104 (second UE 104), UE 350, at least one eMBB UE 506, at least one second UE 1055, and/or the apparatus 702/702'.

In order to illustrate a timeline of the operations (e.g., packet generation, packet transmission, packet reception, decoding, power reduction, etc.) performed by each of the three devices, a respective timeline 420, 430, 440 is depicted next to each of the URLLC UE 402, the base station 404, and the at least one eMBB UE 406. Each of the three timelines 420, 430, 440 in FIG. 4 may illustrate a frequency division duplex (FDD) frame structure (e.g., UL and DL transmissions may occur in the same slot) that includes three 14-symbol TTI slots 408, each of which include seven 2-symbol TTI mini-slots 410. However, it should be understood that the URLLC packet timeline 420, the base station packet timeline 430, and the eMBB packet timeline 440 represent the same time and/or frequency resources that may be available to the URLLC UE 402, the base station 404, and the at least one eMBB UE 406.

Furthermore, the FDD frame structure illustrated in FIG. 4 is not restricted to three 14-symbol TTI slots 408 that each include seven 2-symbol TTI mini-slots 410. Instead, the FDD frame structure my include more or fewer than three slots 408, each slot 408 may include more or fewer than fourteen symbols and more or fewer than seven mini-slots 410, and each mini-slot 410 may include more or fewer than two symbols.

Referring to FIG. 4, the URLLC packet timeline 420 illustrates the operations that may be performed by the URLLC UE 402, the base station packet timeline 430 illustrates the operations that may be performed by the base station 404, and the eMBB packet timeline 440 illustrates the operations that may be performed by the at least one eMBB UE 406.

In certain configurations, the at least one eMBB UE 406 may initiate (at 401) the generation of at least one eMBB packet for transmission on one or more resources in the third slot. In certain aspects, the generation of the at least one eMBB packet may be initiated prior to receiving a PI in the single preconfigured mini-slot of the second slot. The K2 delay for eMBB packet generation 412 illustrated in FIG. 4 may include sixteen mini-slots from the time of initiation (e.g., in the first mini-slot of the first slot) to the last mini-slot (e.g., the second mini-slot in the third slot) prior to the time of transmission (e.g., in the third mini-slot of the third slot). However, the K2 delay for eMBB packet generation 412 may include any number of mini-slots such that preemption may still be achieved when a PI is received in the single preconfigured mini-slot.

The URLLC UE 402 may initiate (at 403) the generation of at least one URLLC packet, and may transmit (at 405) either a URLLC request in a grant-based system or a previously generated URLLC packet in a grant-free system. In the grant-based system, the URLLC UE 402 may receive a resource grant for the URLLC request. In the grant-free system, the URLLC UE 402 may transmit the URLLC packets without receiving a grant in order to reduce system overhead. In the grant-free system, receiving a URLLC packet may indicate to the base station 404 that at least one subsequent URLLC packet may be transmitted by the URLLC UE 402 at a preconfigured interval (e.g., the third mini-slot in every other slot). Hence, in the grant-free system, the base station 404 may not recognize that URLLC packets are being transmitted until after the first URLLC packet is received (e.g., in the sixth mini-slot in the first slot).

The K2 delay for URLLC packet generation 414 illustrated in FIG. 4 may include fifteen mini-slots from the time of initiation (e.g., in the second mini-slot of the first slot) to the last mini-slot (e.g., the second mini-slot of the third slot) prior to the time of transmission (e.g., in the third mini-slot of the third slot). However, the K2 delay for URLLC packet generation 414 may include any number of mini-slots such that preemption may still be achieved when a PI is received in the single preconfigured mini-slot.

Upon receiving either the URLLC request or the URLLC packet in the sixth mini-slot of the first slot, the base station 404 may generate a PI that includes a resource index associated with a subsequent URLLC packet transmission by the URLLC UE 402. The resource index may be explicitly indicated in the URLLC request (or initial URLLC packet transmission) or implicitly indicated by the mini-slot in which the URLLC request is received. For example, when the resource index is implicitly indicated, the base station 404 may determine that the URLLC packet may be transmitted in the third mini-slot in the third slot based on the URLLC request being received (at 405) in the sixth mini-slot of the first slot. Otherwise, the URLLC request may explicitly indicate that a URLLC packet may be transmitted in the third mini-slot of the third slot.

In either scenario, the base station 404 may transmit (at 407) the PI with the resource index such that the PI will be received by the at least one eMBB UE 406 in the single preconfigured mini-slot of the second slot (e.g., the fourth mini-slot of the second slot). In the example illustrated in FIG. 4, the transmission duration of the PI (e.g., from the mini-slot in which the PI is transmitted to the mini-slot in which the PI is received) is four mini-slots. Hence, the base station 404 in FIG. 4 may be preconfigured to transmit the PI in the first mini-slot of the second slot such that the PI may be received in the fourth mini-slot in the second slot (e.g., the single preconfigured mini-slot) by the at least one eMBB UE 406. In the example illustrated in FIG. 4, the at least one eMBB UE 406 may be preconfigured to monitor (at 409) the fourth mini-slot in every other slot (e.g., the second slot, the fourth slot (not illustrated), the sixth slot (not illustrated), etc.). In other words, the at least one eMBB UE 406 may be configured to enter a monitoring state during the fourth mini-slot in the second slot, and remain in a non-monitoring state in all mini-slots (e.g., all mini-slots in the first slot, the first mini-slot in the second slot, second mini-slot in the second slot, third mini-slot in the second slot, fifth mini-slot in the second slot, sixth mini-slot in the second slot, and seventh mini-slot in the second slot, and all mini-slots in the third slot) other than the single preconfigured mini-slot (e.g., the fourth mini-slot in the second slot) in each of the plurality of slots.

Although the at least one eMBB UE 406 in FIG. 4 is preconfigured to monitor the fourth mini-slot in the second slot (and every other slot), the at least one eMBB UE 406 may be preconfigured to monitor any single preconfigured mini-slot in any number of slots such that at most a single mini-slot is monitored in each slot. For example, the at least one eMBB UE 406 may be preconfigured to monitor the third mini-slot in each slot (e.g., the first slot, second slot, third slot, etc.). In an alternative example, the at least one eMBB UE 406 may be preconfigured to monitor the fifth mini-slot in every third slot. The number of slots in which the at least one eMBB UE 406 may monitor a mini-slot for a PI may be preconfigured based on one or more of the K2 delay for eMBB packet generation 412, the K2 delay for URLLC packet generation 414, the K2 delay for preemption 416, and a frequency of URLLC packet transmission (e.g., every slot, every other slot, every third slot, etc.).

Upon receiving the PI in the fourth mini-slot of the second slot, the at least one eMBB UE 406 may decode (at 411) the PI to obtain the resource index associated with the reduced transmission power of the eMBB packet(s). In certain configurations, the reduced transmission power may be preconfigured at the at least one eMBB UE 406 (e.g., via RRC signaling). In certain other configurations, the reduced transmission power may be indicated by the PI.

In certain implementations, the at least one eMBB UE 406 may perform (at 413) power reduction of the at least one eMBB packet upon obtaining the resource index associated with the reduced transmission power from the decoding (at 411) of the PI. In certain other implementations, the at least one eMBB UE 406 may determine not to transmit the at least one eMBB packet upon decoding the PI. For example, the at least one eMBB UE 406 may be preconfigured to refrain from transmitting an eMBB packet using the same time and/or frequency resources on which the URLLC UE 402 transmits a URLLC packet.

The K2 delay for preemption 416 (e.g., duration of receiving the PI, decoding the PI, and reducing the power of the eMBB packet) illustrated in FIG. 4 may include six mini-slots from the time the PI is received (e.g., in the fourth mini-slot of the second slot) to the last mini-slot (e.g., the second mini-slot in the third slot) prior to the time of URLLC packet transmission (e.g., in the third mini-slot in the third slot) or eMBB packet transmission if the eMBB packet is concurrently transmitted with the URLLC packet (e.g., in the third mini-slot of the third slot). However, the K2 delay for preemption 416 may be include any number of mini-slots such that preemption may still be achieved when a PI is received in the single preconfigured mini-slot.

The URLLC UE 402 may transmit (at 415) the URLLC packet using the time and/or frequency resources (e.g., the third mini-slot in the third slot) indicated by the resource index included in the PI. In implementations in which the eMBB packet(s) are concurrently transmitted with the URLLC packet, the at least one eMBB UE 406 may transmit (at 417) the eMBB packet(s) using a reduced power. Alternatively, the at least one eMBB UE 406 may refrain (at 417) from transmitting the eMBB packet(s) using the time and/or frequency resources used by the URLLC UE 402 to transmit (at 415) the URLLC packet.

Using the slot-based PI monitoring technique(s) described above in connection with FIG. 4, the at least one eMBB UE 406 of the present disclosure may use a reduced amount of battery power as compared to mini-slot based PI monitoring while still supporting URLLC puncturing in order help the network achieve the stringent latency and reliability conditions for URLLC.

Figure 5:
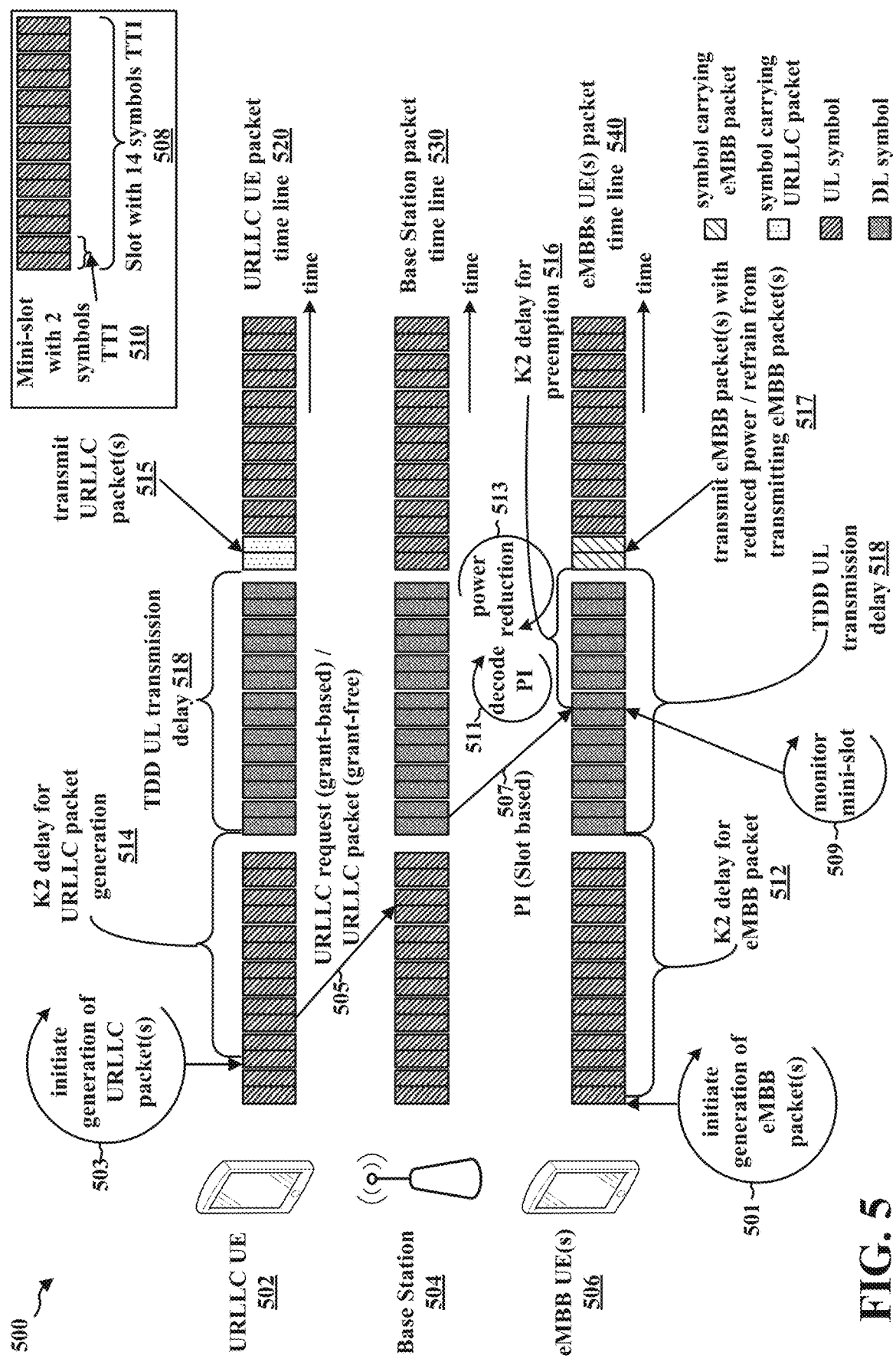
FIG. 5 is a diagram illustrating a wireless communication system that may be used for slot-based PI transmission in accordance with certain aspects of the disclosure.

FIG. 5 is a diagram illustrating a wireless communication system 500 that may be used for slot-based PI transmission in accordance with certain aspects of the disclosure. The wireless communication system 500 may include a URLLC UE 502, a base station 504, and at least one eMBB UE 506. The URLLC UE 502 may correspond to, e.g., the UE 104 (first UE 104'), 350, URLLC UE 402, and/or first UE 1050. The base station 504 may correspond to, e.g., base station 102/180, base station 310, base station 404, base station 750, and/or the apparatus 1002/1002'. The at least one eMBB UE 506 may correspond to, e.g., the UE 104 (second UE 104), 350, at least one eMBB UE 406, at least one second UE 1055, and/or the apparatus 702/702'.

In order to illustrate a timeline of the operations (e.g., packet generation, packet transmission, packet reception, decoding, power reduction, etc.) performed by each of the three devices, a respective timeline 520, 530, 540 is depicted next to each of the URLLC UE 502, the base station 504, and the at least one eMBB UE 506. Each of the three timelines 520, 530, 540 in FIG. 5 may illustrate a time division duplex (TDD) frame structure (e.g., UL and DL transmissions are separated into different slots) that includes three 14-symbol TTI slots 508, each of which include seven 2-symbol TTI mini-slots 510. However, it should be understood that the URLLC packet timeline 520, the base station packet timeline 530, and the eMBB packet timeline 540 represent the same time and/or frequency resources that may be available to the URLLC UE 502, the base station 504, and the at least one eMBB UE 506 depending on whether the slot is dedicated for UL transmissions (e.g., the first slot and the third slot) or DL transmissions (e.g., the second slot). In FIG. 5, the DL slot (e.g., second slot) may create a TDD UL transmission delay 518 during which no UL transmissions (e.g., URLLC packet, eMBB packet, etc.) may be sent by either the URLLC UE 502 and/or the at least one eMBB UE 506.

Furthermore, the TDD frame structure illustrated in FIG. 5 is not restricted to three 14-symbol TTI slots 508 that each include seven 2-symbol TTI mini-slots 510. Instead, the TDD frame structure my include more or fewer than three slots 508, each slot 508 may include more or fewer than fourteen symbols and more or fewer than seven mini-slots 510, and each mini-slot 510 may include more or fewer than two symbols.

Referring to FIG. 5, the URLLC packet timeline 520 illustrates the operations that may be performed by the URLLC UE 502, the base station packet timeline 530 illustrates the operations that may be performed by the base station 504, and the eMBB packet timeline 540 illustrates the operations that may be performed by the at least one eMBB UE 506.

In certain configurations, the at least one eMBB UE 506 may initiate (at 501) the generation of at least one eMBB packet for transmission on one or more resources in the third slot. In certain aspects, the generation of the at least one eMBB packet may be initiated prior to receiving a PI in the single preconfigured mini-slot of the second slot. The K2 delay for eMBB packet generation 512 illustrated in FIG. 5 may include seven UL mini-slots from the time of initiation (e.g., in the first mini-slot of the first slot) to the last mini-slot (e.g., the seventh mini-slot in the first slot) prior to transmission (e.g., in the first mini-slot of the third slot—the subsequent UL slot). However, the K2 delay for eMBB packet generation 512 may include any number of mini-slots such that preemption may still be achieved when a PI is received in the single preconfigured mini-slot.

The URLLC UE 502 may initiate (at 503) the generation of at least one URLLC packet, and may transmit (at 505) either a URLLC request in a grant-based system or a previously generated URLLC packet in a grant-free system. In the grant-based system, the URLLC UE 502 may receive (not illustrated in FIG. 5) a resource grant for the URLLC request. In the grant-free system, the URLLC UE 502 may transmit the URLLC packets without receiving a grant in order to reduce system overhead. In the grant-free system, receiving a URLLC packet may indicate to the base station 504 that at least one subsequent URLLC packet may be transmitted by the URLLC UE 502 in a subsequent mini-slot in a subsequent slot. Hence, in the grant-free system, the base station 504 may not recognize that URLLC packets are being transmitted until after the first URLLC packet is received (e.g., in the sixth mini-slot in the first slot).

The K2 delay for URLLC packet generation 514 illustrated in FIG. 5 may include six mini-slots from the time of initiation (e.g., in the second mini-slot of the first slot) to the last mini-slot (e.g., the seventh mini-slot in the first slot) prior to the time of transmission (e.g., in the first mini-slot in the third slot—the subsequent UL slot). However, the K2 delay for URLLC packet generation 514 may include any number of mini-slots such that preemption may still be achieved when a PI is received in the single preconfigured mini-slot.

Upon receiving either the URLLC request or the URLLC packet in the sixth mini-slot of the first slot, the base station 504 may generate (operation not illustrated in FIG. 5) a PI that includes a resource index associated with a subsequent URLLC packet transmission by the URLLC UE 502. The resource index may be explicitly indicated in the URLLC request (or initial URLLC packet transmission) or implicitly indicated by the mini-slot in which the URLLC request is received. For example, when the resource index is implicitly indicated, the base station 504 may determine that a URLLC packet may be transmitted in the first mini-slot in the third slot based on the URLLC request being received (at 505) in the sixth mini-slot of the first slot. Otherwise, the URLLC request may explicitly indicate that a URLLC packet may be transmitted in the first mini-slot of the third slot.

In either scenario, the base station 504 may transmit (at 507) the PI with the resource index such that the PI will be received by the at least one eMBB UE 506 in the single preconfigured mini-slot of the second slot (e.g., the fourth mini-slot of the second slot—a DL slot). In the example illustrated in FIG. 5, the transmission duration of the PI (e.g., from the mini-slot in which the PI is transmitted to the mini-slot in which the PI is received) is four mini-slots. Hence, the base station 504 in FIG. 5 may be preconfigured to transmit the PI in the first mini-slot of the second slot such that the PI may be received in the fourth mini-slot in the second slot (e.g., the single preconfigured mini-slot) by the at least one eMBB UE 506. In the example illustrated in FIG. 5, the at least one eMBB UE 506 may be preconfigured to monitor (at 509) the fourth mini-slot in every other slot (e.g., each DL slot, the second slot, the fourth slot (not illustrated), the sixth slot (not illustrated), etc.). In other words, the at least one eMBB UE 506 may be configured to enter a monitoring state during the fourth mini-slot in the second slot, and remain in a non-monitoring state in all mini-slots (e.g., all mini-slots in the first slot, the first mini-slot in the second slot, second mini-slot in the second slot, third mini-slot in the second slot, fifth mini-slot in the second slot, sixth mini-slot in the second slot, and seventh mini-slot in the second slot, and all mini-slots in the third slot) other than the single preconfigured mini-slot (e.g., the fourth mini-slot in the second slot) in each of the plurality of slots.

Although the at least one eMBB UE 506 in FIG. 5 is preconfigured to monitor the fourth mini-slot in the second slot (and every DL slot), the at least one eMBB UE 506 may be preconfigured to monitor any single preconfigured mini-slot in any number of DL slots such that at most a single mini-slot is monitored in each DL slot. For example, the eMBB UE 506 may be preconfigured to monitor the third mini-slot in each DL slot. In an alternative example, the at least one eMBB UE 506 may be preconfigured to monitor the fifth mini-slot in every other DL slot (e.g., second slot, sixth slot, tenth slot, etc.). The number of DL slots in which the at least one eMBB UE 506 may monitor a mini-slot for a PI may be preconfigured based on one or more of the K2 delay for eMBB packet generation 512, the K2 delay for URLLC packet generation 514, the K2 delay for preemption 516, and a frequency of URLLC packet transmission (e.g., every UL slot, every other UL slot, every UL third slot, etc.).

Upon receiving the PI in the fourth mini-slot of the second slot, the at least one eMBB UE 506 may decode (at 511) the PI to obtain the resource index associated with the reduced transmission power of the eMBB packet(s). In certain configurations, the reduced transmission power may be preconfigured at the at least one eMBB UE 506 (e.g., via RRC signaling). In certain other configurations, the reduced transmission power may be indicated by the PI.

In certain implementations, the at least one eMBB UE 506 may perform (at 513) power reduction of the at least one eMBB packet upon obtaining the resource index associated with the reduced transmission power from the decoding (at 511) of the PI. In certain other implementations, the at least one eMBB UE 506 may determine not to transmit the at least one eMBB packet upon decoding the PI. For example, the at least one eMBB UE 506 may be preconfigured to refrain from transmitting an eMBB packet using the same time and/or frequency resources on which the URLLC UE 502 transmits a URLLC packet.

The K2 delay for preemption 516 (e.g., duration of receiving the PI, decoding the PI, and reducing the power of the eMBB packet) illustrated in FIG. 5 may include five mini-slots from the time the PI is received (e.g., in the fourth mini-slot of the second slot) to the last mini-slot (e.g., the second mini-slot in the third slot) prior to the time of URLLC packet transmission (e.g., in the first mini-slot in the third slot) or eMBB packet transmission if the eMBB packet is concurrently transmitted with the URLLC packet (e.g., in the third mini-slot of the third slot). However, the K2 delay for preemption 516 may be include any number of mini-slots such that preemption may still be achieved when a PI is received in the single preconfigured mini-slot of a DL slot. Due to the TDD UL transmission delay 518, even when the K2 delay for eMBB packet generation 512 is seven mini-slots (e.g., the eMBB packet would normally be transmitted in the first slot of the second slot if the second slot were configured for UL transmissions as illustrated in FIG. 4), transmission power reduction of the eMBB packet(s) may still occur when a TDD frame structure is used.

The URLLC UE 502 may transmit (at 515) the URLLC packet using the time and/or frequency resources (e.g., the third mini-slot in the third slot) indicated by the resource index included in the PI. In implementations in which the eMBB packet(s) are concurrently transmitted with the URLLC packet, the at least one eMBB UE 506 may transmit (at 517) the eMBB packet(s) using a reduced power. Alternatively, the eMBB UE 506 may refrain (at 517) from transmitting the eMBB packet(s) using the time and/or frequency resources used by the URLLC UE 502 to transmit (at 515) the URLLC packet.

Using the slot-based PI monitoring technique(s) described above in connection with FIG. 5, the at least one eMBB UE 506 of the present disclosure may use a reduced amount of battery power as compared to mini-slot based PI monitoring while still supporting URLLC puncturing in order help the network achieve the stringent latency and reliability conditions for URLLC.

FIG. 6 is a flowchart 600 of a method of wireless communication. The method may be performed by a UE (e.g., the UE 104 (second UE 104), UE 350, at least one eMBB UE 406, 506, at least one second UE 1055, and/or the apparatus 702/702'). In FIG. 6, optional operations are indicated with dashed lines. In other aspects, one or more operations may be omitted, transposed, and/or contemporaneously performed.

At 602, the UE may initiate a generation of the at least one packet for transmission on one or more resources in a second slot (e.g., the third mini-slot in the third slot in FIG. 4 and the first mini-slot in the third slot in FIG. 5) prior to receiving the PI in the single preconfigured mini-slot of a first slot (e.g., the fourth mini-slot in the second slot in FIGS. 4 and 5). For example, referring to FIGS. 4 and 5, the at least one eMBB UE 406, 506 may initiate (at 401, 501) the generation of at least one eMBB packet for transmission on one or more resources in the third slot.

In certain aspects, the UE may initiate generation of the at least one packet for transmission on one or more resources in a second slot by first receiving data from an upper layer (e.g., an application layer), and the UE may schedule the data for transmission on one or more resources in the second slot. In one aspect, the UE may pass the data through one or more other layers, and the UE may packetize the data at least one other layer before packetizing the data at a lower layer for transmission, such as by constructing at least one header of the at least one packet by at least one of the one or more other layers.

In certain aspects of 602, a second time period associated with the generation of the at least one packet (e.g., the K2 delay for eMBB packet generation 412, 512) may be longer than a first time period associated with the decoding the PI and the performing the power reduction (e.g., the K2 delay for preemption 416, 516).

In certain other aspects of 602, the generation of the at least one packet may be initiated in a third slot (e.g., the first slot in FIGS. 4 and 5) that is located before the first slot (e.g., the second slot in FIGS. 4 and 5) and the second slot (e.g., the third slot in FIGS. 4 and 5) in a time domain.

At 604, the UE may monitor a single preconfigured mini-slot in each of a plurality of slots for a PI. For example, referring to FIG. 4, the at least one eMBB UE 406 may be preconfigured to monitor (at 409) the fourth mini-slot in every other slot (e.g., the second slot, the fourth slot (not illustrated), the sixth slot (not illustrated), etc.). Referring to FIG. 5, the at least one eMBB UE 506 may be preconfigured to monitor (at 509) the fourth mini-slot in every other slot (e.g., each DL slot, the second slot, the fourth slot (not illustrated), the sixth slot (not illustrated), etc.).

In certain aspects, the UE may monitor a single preconfigured mini-slot in each of a plurality of slots for a PI by transitioning from a lower-power state to a higher-power state for the single preconfigured mini-slot—e.g., the UE may activate receiver circuitry that was previously not detecting for PI signal(s) on mini-slots. Further, the UE may detect for PI signal(s) in the single preconfigured mini-slot when in the higher-power state.

In certain aspects of 604, the plurality of slots may be associated with an FDD configuration. For example, referring to FIG. 4, each of the three timelines 420, 430, 440 may illustrate an FDD frame structure (e.g., UL and DL transmissions may occur in the same slot) that includes three 14-symbol TTI slots 408, each of which include seven 2-symbol TTI mini-slots 410.

In certain other aspects of 604, the plurality of slots may be associated with a TDD configuration. For example, referring to FIG. 5, each of the three timelines 520, 530, 540 may illustrate a TDD frame structure (e.g., UL and DL transmissions are separated into different slots) that includes three 14-symbol TTI slots 508, each of which include seven 2-symbol TTI mini-slots 510.

In certain other aspects of 604, the UE may remain in a non-monitoring state in all mini-slots other than the single preconfigured mini-slot in each of the plurality of slots. For example, the UE operate in a higher-power state in a first single preconfigured mini-slot in each of a plurality of slots. After the first single preconfigured mini-slot in each of the plurality of slots, the UE may transition to a lower-power state—e.g., the UE may reduce the power consumed by receiver circuitry that was previously detecting for PI signal(s) on the first single preconfigured mini-slot. The UE may remain in the lower-power state until a second (e.g., next) preconfigured mini-slot—e.g., the UE may refrain from detecting for PI signal(s) on mini-slots between the first and second preconfigured mini-slots. For example, referring to FIGS. 4 and 5, the at least one eMBB UE 406, 506 may remain in a non-monitoring state in all mini-slots (e.g., all mini-slots in the first slot, the first mini-slot in the second slot, second mini-slot in the second slot, third mini-slot in the second slot, fifth mini-slot in the second slot, sixth mini-slot in the second slot, and seventh mini-slot in the second slot, and all mini-slots in the third slot) other than the single preconfigured mini-slot (e.g., the fourth mini-slot in the second slot) in each of the plurality of slots.

At 606, the UE may receive the PI in the single preconfigured mini-slot of a first slot (e.g., the fourth mini-slot of the second slot in FIGS. 4 and 5) of the plurality of slots. In certain aspects, the PI may include a resource index associated with a reduced transmission power by the UE. In certain other aspects, the resource index may include one or more resources in a second slot (e.g., the third slot in FIGS. 4 and 5). For example, referring to FIGS. 4 and 5, the base station 404, 504 may transmit (at 407, 507) the PI with the resource index such that the PI will be received by the at least one eMBB UE 406, 506 in the single preconfigured mini-slot of the second slot (e.g., the fourth mini-slot of the second slot).

At 608, the UE may decode the PI received in the single preconfigured mini-slot of the first slot (e.g., the fourth mini-slot in the second slot in FIGS. 4 and 5) of the plurality of slots to obtain the resource index associated with the reduced transmission power. For example, referring to FIGS. 4 and 5, upon receiving the PI in the fourth mini-slot of the second slot, the at least one eMBB UE 406, 506 may decode (at 411, 511) the PI to obtain the resource index associated with the reduced transmission power of the eMBB packet(s).

In certain aspects, the UE may decode the PI received in the single preconfigured mini-slot of the first slot of the plurality of slots to obtain the resource index associated with the reduced transmission power by converting a received analog signal into a digital signal. The UE may perform a decoding check on the signal, such as a cyclic redundancy check (CRC). The UE may pass the signal from a lower layer (e.g., PHY layer) to an upper layer (e.g., MAC layer). The UE may extract the resource index associated with the reduced transmission power from the signal.

At 610, the UE may perform power reduction of the at least one packet upon obtaining the resource index associated with the reduced transmission power from the decoding of the PI. For example, referring to FIGS. 4 and 5, the at least one eMBB UE 406, 506 may perform (at 413, 513) power reduction of the at least one eMBB packet upon obtaining the resource index associated with the reduced transmission power from the decoding (at 411, 511) of the PI.

In certain aspects, the UE may perform power reduction of the at least one packet upon obtaining the resource index associated with the reduced transmission power from the decoding of the PI by identifying at least one resource corresponding to the resource index. The UE may determine an amount by which the transmission power should be reduced on the at least one identified resource, which may include reducing the transmission power to nothing (e.g., refraining from transmitting). The UE may set the transmission power on the at least one identified resource based on the determined amount.

In certain configurations of 610, the reduced transmission power may be preconfigured at the at least one eMBB UE 406, 506 (e.g., via RRC signaling). In certain other configurations of 610, the first time period associated with the decoding the PI and the performing the power reduction (e.g., the K2 delay for preemption 416, 516 in FIGS. 4 and 5) is less than an entire slot duration (e.g., 14 symbols, seven two-symbol mini-slots in FIGS. 4 and 5).

At 612, the UE may transmit at least one packet with the reduced transmission power on the one or more resources in the second slot or refrain from transmitting the at least one packet on the one or more resources in the second slot (e.g., the third mini-slot in the third slot in FIG. 4 and the first mini-slot in the third slot in FIG. 5). The UE may transmit at least one packet with the reduced transmission power on the one or more resources in the second slot or refrain from transmitting the at least one packet on the one or more resources in the second slot based on the received PI (shown at 606), e.g., based on decoding the PI to obtain the resource index (shown at 608). For example, referring to FIGS. 4 and 5, in implementations in which the eMBB packet(s) are concurrently transmitted with the URLLC packet, the at least one eMBB UE 406, 506 may transmit (at 417, 517) the eMBB packet(s) using a reduced power. Alternatively, the at least one eMBB UE 406, 506 may refrain (at 417, 517) from transmitting the eMBB packet(s) using the time and/or frequency resources used by the URLLC UE 402, 502 to transmit (at 415, 515) the URLLC packet.

Figure 7:
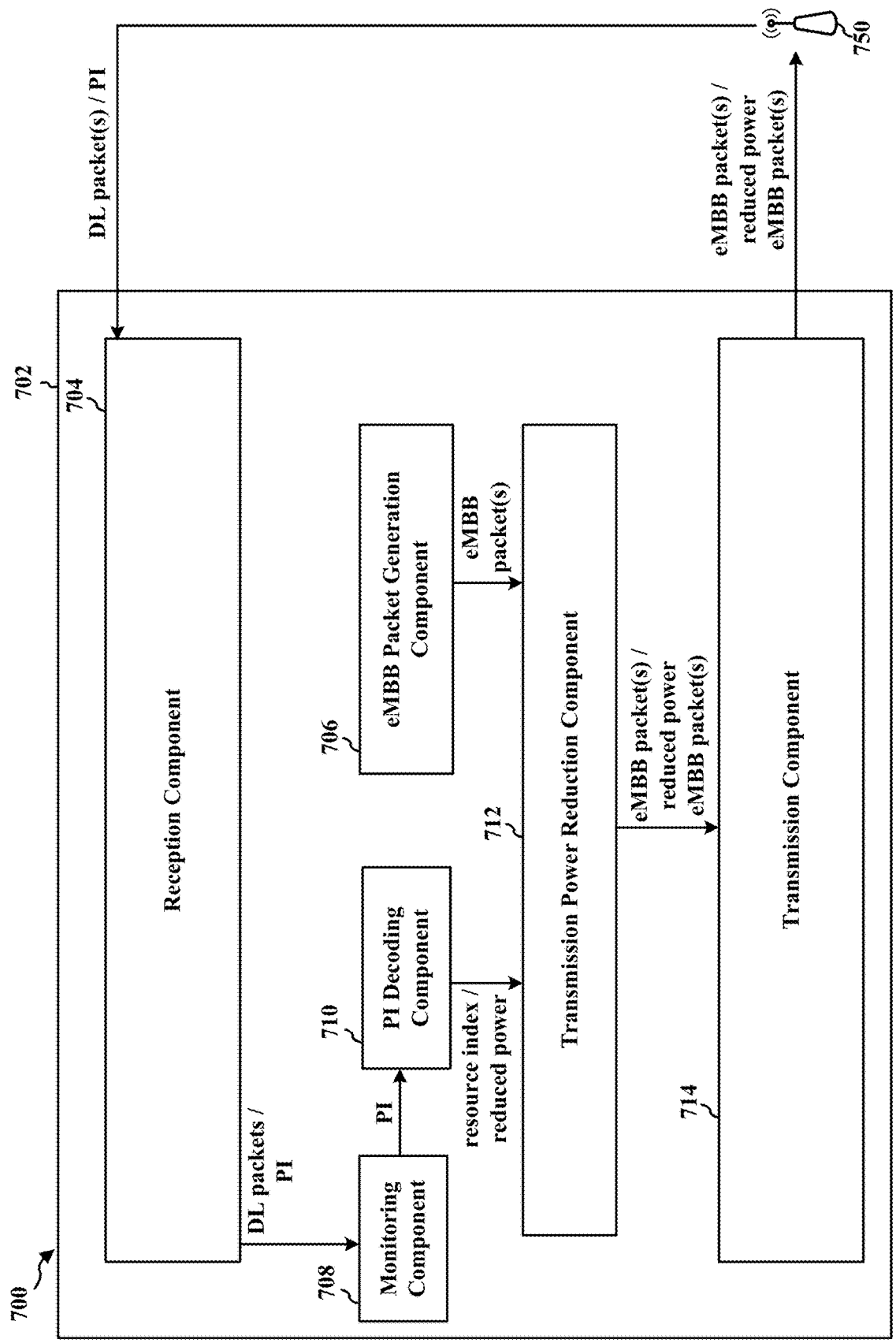
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., the UE 104 (second UE 104), UE 350, at least one eMBB UE 406, 506, at least one second UE 1055, and/or the apparatus 702') in communication with a base station 750 (e.g., the base station 102/180, base station 310, base station 404, base station 504, and/or the apparatus 1002/1002'). The apparatus may include a reception component 704, an eMBB packet generation component 706, a monitoring component 708, a PI decoding component 710, a transmission power reduction component 712, and a transmission component 714.

In certain configurations, the eMBB packet generation component 706 may be configured to initiate a generation of the at least one packet for transmission on one or more resources in a second slot (e.g., the third mini-slot in the third slot in FIG. 4 and the first mini-slot in the third slot in FIG. 5) prior to receiving the PI in the single preconfigured mini-slot of a first slot (e.g., the fourth mini-slot in the second slot in FIGS. 4 and 5). In certain aspects, a second time period associated with the generation of the at least one packet (e.g., the K2 delay for eMBB packet generation 412, 512) may be longer than a first time period associated with the decoding the PI and the performing the power reduction (e.g., the K2 delay for preemption 416, 516). In certain other aspects, the generation of the at least one packet may be initiated in a third slot (e.g., the first slot in FIGS. 4 and 5) that is located before the first slot (e.g., the second slot in FIGS. 4 and 5) and the second slot (e.g., the third slot in FIGS. 4 and 5) in a time domain.

The reception component 704 may be configured to receive one or more DL packet(s) (e.g., in DL mini-slot, DL slots, DL resources, etc.) that may include a PI from the base station 750. In certain configurations, the reception component 704 may be configured to receive the PI in the single preconfigured mini-slot of a first slot (e.g., the fourth mini-slot of the second slot in FIGS. 4 and 5) of the plurality of slots. In certain aspects, the PI may include a resource index associated with a reduced transmission power by the UE. In certain other aspects, the resource index may include one or more resources in a second slot (e.g., the third slot in FIGS. 4 and 5). In certain configurations, the reception component 704 may be configured to send the DL packet(s) that may include the PI to the monitoring component 708.

The monitoring component 708 may be configured to monitor a single preconfigured mini-slot in each of a plurality of slots for the PI. In certain aspects, the plurality of slots may be associated with an FDD configuration. In certain other aspects, the plurality of slots may be associated with a TDD configuration. In certain other aspects, the monitoring component 708 may be configured to enter and/or remain in a non-monitoring state in all mini-slots other than the single preconfigured mini-slot in each of the plurality of slots. In certain other aspects, the monitoring component 708 may be configured to enter a monitoring state during the single preconfigured mini-slot in each of the plurality of slots. In certain other aspects, the monitoring component 708 may be configured to send a signal associated with the PI to the PI decoding component 710.

The PI decoding component 710 may be configured to decode the PI received in the single preconfigured mini-slot of the first slot (e.g., the fourth mini-slot in the second slot in FIGS. 4 and 5) of the plurality of slots to obtain the resource index associated with the reduced transmission power. The PI decoding component 710 may be configured to send a signal associated with the resource index/reduced transmission power to one or more of the eMBB packet generation component 706 and/or the transmission power reduction component 712.

The transmission power reduction component 712 may be configured to perform power reduction of the at least one packet upon obtaining the resource index associated with the reduced transmission power from the decoding of the PI. In certain aspects, the reduced transmission power may be preconfigured at the transmission power reduction component 712. In certain other aspects, the first time period associated with the decoding the PI and the performing the power reduction (e.g., the K2 delay for preemption 416, 516 in FIGS. 4 and 5) is less than an entire slot duration (e.g., 14 symbols, seven two-symbol mini-slots in FIGS. 4 and 5).

The transmission power reduction component 712 maybe configured to send a signal associated with at least one eMBB packet (e.g., when no PI is received) or a reduced transmission power eMBB packet (e.g., when a PI is received) to the transmission component 714.

The transmission component 714 may be configured to transmit (e.g., to the base station 750) at least one packet with the reduced transmission power on the one or more resources in the second slot or configured to refrain from transmitting the at least one packet on the one or more resources in the second slot (e.g., the third mini-slot in the third slot in FIG. 4 and the first mini-slot in the third slot in FIG. 5). In certain configurations, the transmission power reduction component 712 may send a signal with the eMBB packet or a signal without an eMBB packet indicating that the transmission component 714 refrains from transmitting the at least one packet.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
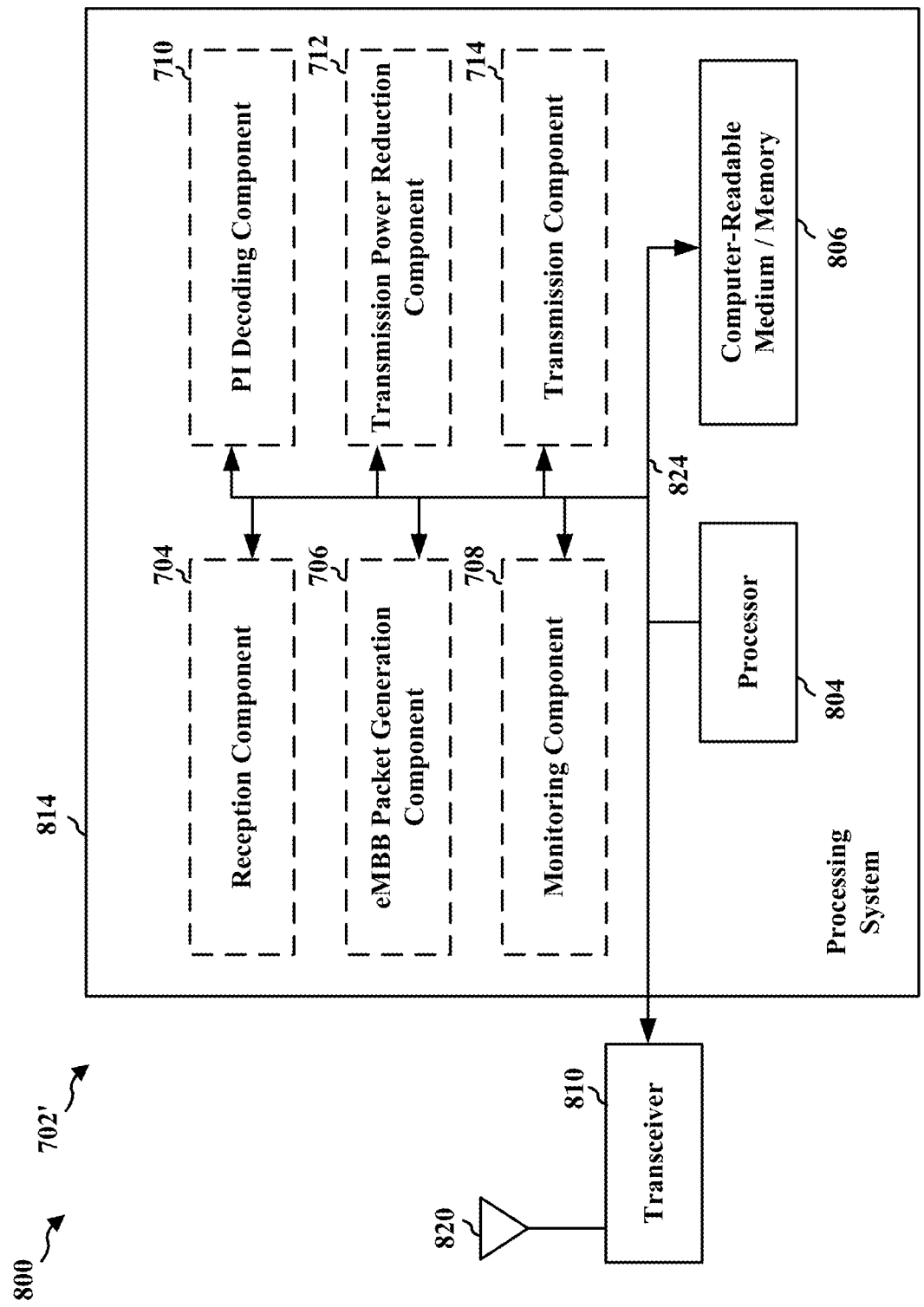
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 714, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for initiating a generation of the at least one packet for transmission on one or more resources in a second slot (e.g., the third mini-slot in the third slot in FIG. 4 and the first mini-slot in the third slot in FIG. 5) prior to receiving the PI in the single preconfigured mini-slot of a first slot (e.g., the fourth mini-slot in the second slot in FIGS. 4 and 5). In certain aspects, a second time period associated with the generation of the at least one packet (e.g., the K2 delay for eMBB packet generation 412, 512) may be longer than a first time period associated with the decoding the PI and the performing the power reduction (e.g., the K2 delay for preemption 416, 516). In certain other aspects, the generation of the at least one packet may be initiated in a third slot (e.g., the first slot in FIGS. 4 and 5) that is located before the first slot (e.g., the second slot in FIGS. 4 and 5) and the second slot (e.g., the third slot in FIGS. 4 and 5) in a time domain. In certain other configurations, the apparatus 702/702' for wireless communication may include means for monitoring a single preconfigured mini-slot in each of a plurality of slots for a PI. In certain aspects, the plurality of slots may be associated with an FDD configuration. In certain other aspects, the plurality of slots may be associated with a TDD configuration. In certain other aspects, the UE may remain in a non-monitoring state in all mini-slots other than the single preconfigured mini-slot in each of the plurality of slots. In certain other configurations, the apparatus 702/702' for wireless communication may include means for receiving the PI in the single preconfigured mini-slot of a first slot (e.g., the fourth mini-slot of the second slot in FIGS. 4 and 5) of the plurality of slots. In certain aspects, the PI may include a resource index associated with a reduced transmission power by the UE. In certain other aspects, the resource index may include one or more resources in a second slot (e.g., the third slot in FIGS. 4 and 5). In certain other configurations, the apparatus 702/702' for wireless communication may include means for decoding the PI received in the single preconfigured mini-slot of the first slot (e.g., the fourth mini-slot in the second slot in FIGS. 4 and 5) of the plurality of slots to obtain the resource index associated with the reduced transmission power. In certain other configurations, the apparatus 702/702' for wireless communication may include means for performing power reduction of the at least one packet upon obtaining the resource index associated with the reduced transmission power from the decoding of the PI. In certain aspects, the reduced transmission power may be preconfigured at the at least one eMBB UE 406, 506 (e.g., via RRC signaling). In certain other aspects, the first time period associated with the decoding the PI and the performing the power reduction (e.g., the K2 delay for preemption 416, 516 in FIGS. 4 and 5) is less than an entire slot duration (e.g., 14 symbols, seven two-symbol mini-slots in FIGS. 4 and 5). In certain other configurations, the apparatus 702/702' for wireless communication may include means for transmitting at least one packet with the reduced transmission power on the one or more resources in the second slot or means for refraining from transmitting the at least one packet on the one or more resources in the second slot.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
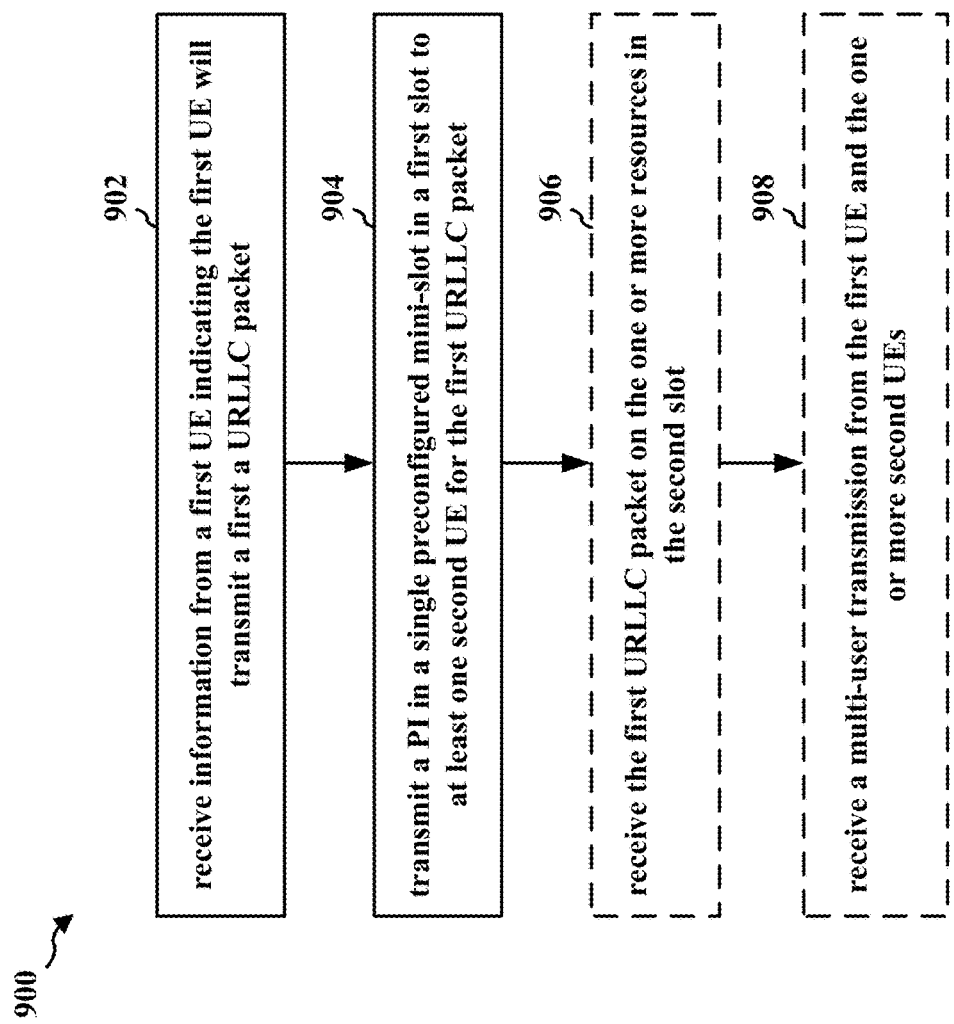
FIG. 9 is a flowchart of a method of wireless communication.

FIG. 9 is a flowchart 900 of a method of wireless communication. The method may be performed by a base station (e.g., the base station 102/180, base station 310, base station 404, base station 504, base station 750, the apparatus 1002/1002'). In FIG. 9, optional operations are indicated with dashed lines. In various other aspects, one or more operations may be omitted, transposed, and/or contemporaneously performed.

At 902, the base station may receive information from a first UE (e.g., URLLC UE 402, 502) indicating the first UE will transmit a first URLLC packet. In certain aspects, the information may include a URLLC request (e.g., grant-based system) indicating that the first URLLC packet will be transmitted by the first UE. In certain other aspects, the information may be a second URLLC packet (e.g., received in the sixth mini-slot in the first slot in FIGS. 4 and 5) received prior to receiving the first URLLC packet (e.g., received in the third mini-slot in the third slot in FIG. 4 and received in the first mini-slot in the first slot in FIG. 5) from the first UE. For example, referring to FIGS. 4 and 5, the URLLC UE 402, 502 may transmit (at 405, 505) either a URLLC request in a grant-based system or a previously generated URLLC packet in a grant-free system.

At 904, the base station may transmit a PI in a single preconfigured mini-slot in the first slot (e.g., the first mini-slot in the second slot in FIGS. 4 and 5) to at least one second UE (e.g., at least one eMBB UE 406, 506) for the first URLLC packet (e.g., received in the third slot in FIGS. 4 and 5). The base station may transmit a PI in a single preconfigured mini-slot in the first slot to at least one second UE for the first URLLC packet based on the information received from the first UE indicating the first UE will transmit the first URLLC packet (shown at 902). In certain aspects, the PI may indicate a resource index associated with a reduced transmission power by the at least one second UE. In certain other aspects, the resource index may include one or more resources in a second slot (e.g., the third slot in FIGS. 4 and 5). For example, referring to FIGS. 4 and 5, the base station 404, 504 may transmit (at 407, 507) the PI with the resource index such that the PI will be received by the at least one eMBB UE 406, 506 in the single preconfigured mini-slot of the second slot (e.g., the fourth mini-slot of the second slot).

At 906, the base station may receive the first URLLC packet (e.g., the URLLC packet received in the third slot in FIGS. 4 and 5) on the one or more resources in the second slot (e.g., the third slot in FIGS. 4 and 5). For example, referring to FIGS. 4 and 5, the base station 404, 504 may receive the URLLC packet transmitted by the URLLC UE 402, 502 using the time and/or frequency resources (e.g., the third mini-slot in the third slot in FIG. 4 and the first mini-slot in the third slot in FIG. 5) indicated by the resource index included in the PI. In FIGS. 4 and 5, the URLLC packet may be received in a mini-slot in the third slot that is subsequent to the mini-slot used to transmit the URLLC in the third slot.

At 908, the base station may receive a multi-user transmission from the first UE (e.g., the URLLC UE 402, 502) and the at least one second UE (e.g., the at least one eMBB UE 406, 506). In certain aspects, the multi-user transmission may include the first URLLC packet from the first UE and at least one eMBB packet from the at least one second UE.

In certain other aspects, the at least one eMBB packet may be received with a reduced transmission power as compared to a different multi-user transmission that does not include the first URLLC packet. For example, referring to FIGS. 4 and 5, in implementations in which the eMBB packet(s) are concurrently transmitted with the URLLC packet (e.g., multi-user transmission), the at least one eMBB UE 406, 506 may transmit (at 417, 517) the eMBB packet(s) using a reduced power and the URLLC UE 402, 502 may transmit (at 415, 515) the URLLC packet.

Figure 10:
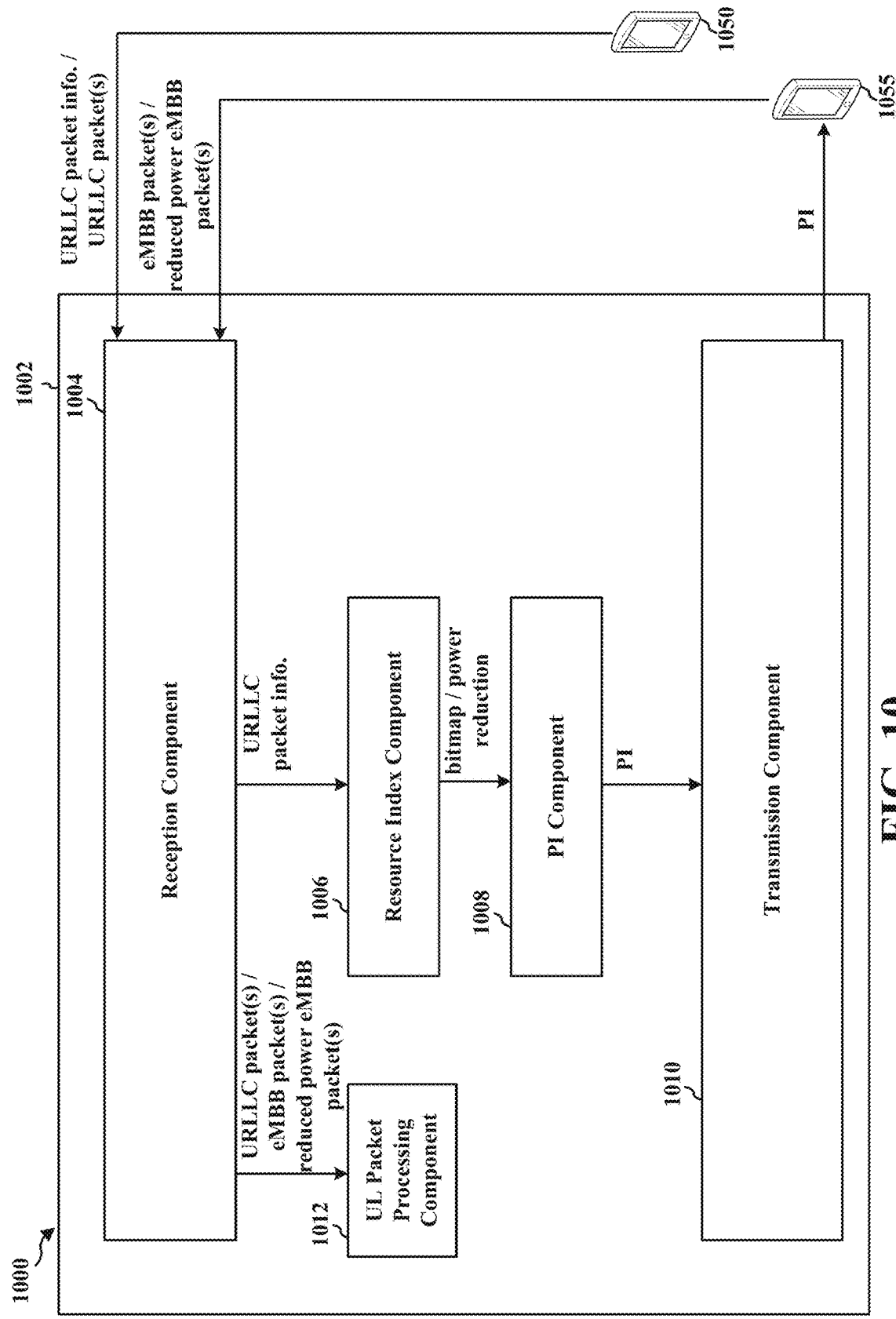
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a base station (e.g., the base station 102/180, base station 310, base station 404, base station 504, base station 750, and/or the apparatus 1002/1002') in communication with a first UE 1050 (e.g., UE 104, 350, URLLC UE 402, 502) and at least one second UE 1055 (e.g., e.g., UE 104, 350, at least one eMBB UE 406, 506, the apparatus 702/702') The apparatus may include a reception component 1004, a resource index component 1006, a PI component 1008, a transmission component 1010, and a UL packet processing component 1012.

The reception component 1004 may be configured to receive information from the first UE 1050 indicating the first UE 1050 will transmit a first URLLC packet. In certain aspects, the information may include a URLLC request (e.g., grant-based system) indicating that the first URLLC packet will be transmitted by the first UE. In certain other aspects, the information may be a second URLLC packet (e.g., received in the sixth mini-slot in the first slot in FIGS. 4 and 5) received prior to receiving the first URLLC packet (e.g., received in the third mini-slot in the third slot in FIG. 4 and received in the first mini-slot in the first slot in FIG. 5) from the first UE. The reception component 1004 may be configured to send a signal associated with the information received from the first UE 1050 to the resource index component 1006.

In certain configurations, the resource index component 1006 may be configured to determine the time and/or frequency resources that will be used for the first URLLC packet by the first UE 1050. The resource index component 1006 may be configured to generate a resource index (e.g., bitmap) associated with the resources that will be used for by the first UE 1050 to transmit the first URLLC packet. In certain aspects, the resource index may include an indication of an amount of power reduction to be used by the at least one second UE 1055 when sending at least one second packet using the resources indicated in the resource index. The resource index component 1006 may be configured to send a signal associated with one or more of the resource index and/or power reduction to the PI component 1008.

The PI component 1008 may be configured to generate a PI based at least in part on one or more of the resource index and/or the power reduction. In certain configurations, the PI may be configured to send a signal associated with the PI to the transmission component 1010.

In certain configurations, the transmission component 1010 may be configured to transmit a PI in a single preconfigured mini-slot in the first slot (e.g., the first mini-slot in the second slot in FIGS. 4 and 5) to at least one second UE (e.g., at least one eMBB UE 406, 506) for the first URLLC packet (e.g., received in the third slot in FIGS. 4 and 5). In certain aspects, the PI may indicate a resource index associated with a reduced transmission power by the at least one second UE. In certain other aspects, the resource index may include one or more resources in a second slot (e.g., the third slot in FIGS. 4 and 5).

In certain other configurations, the reception component 1004 may be configured to receive the first URLLC packet (e.g., the URLLC packet received in the third slot in FIGS. 4 and 5) on the one or more resources in the second slot (e.g., the third slot in FIGS. 4 and 5) from the first UE 1050.

In certain other configurations, the reception component 1004 may be configured to receive a multi-user transmission from the first UE 1050 the at least one second UE 1055. In certain aspects, the multi-user transmission may include the first URLLC packet from the first UE 1050 and at least one eMBB packet from the at least one second UE 1055. In certain other aspects, the at least one eMBB packet may be received with a reduced transmission power as compared to a different multi-user transmission that does not include the first URLLC packet.

The reception component 1004 may be configured to send the multi-user transmission and/or the first URLLC packet to the UL packet processing component 1012. The UL packet processing component 1012 may be configured to process the URLLC packet and/or the multi-user transmission.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
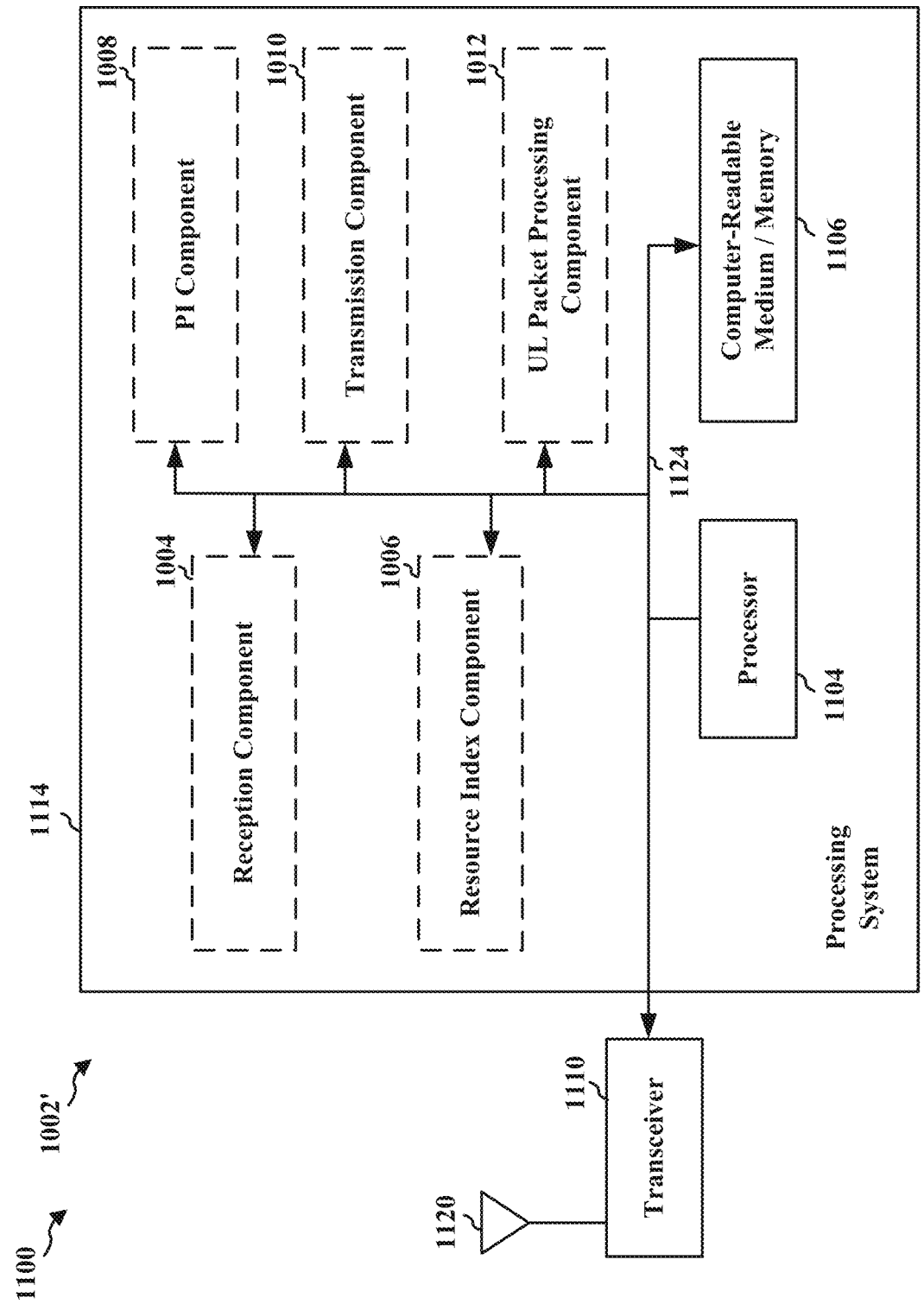
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for receiving information from a first UE (e.g., URLLC UE 402, 502) indicating the first UE will transmit a first URLLC packet. In certain aspects, the information may include a URLLC request (e.g., grant-based system) indicating that the first URLLC packet will be transmitted by the first UE. In certain other aspects, the information may be a second URLLC packet (e.g., received in the sixth mini-slot in the first slot in FIGS. 4 and 5) received prior to receiving the first URLLC packet (e.g., received in the third mini-slot in the third slot in FIG. 4 and received in the first mini-slot in the first slot in FIG. 5) from the first UE. In certain other configurations, the apparatus 1002/1002' for wireless communication may include means for transmitting a PI in a single preconfigured mini-slot in the first slot (e.g., the first mini-slot in the second slot in FIGS. 4 and 5) to at least one second UE (e.g., at least one eMBB UE 406, 506) for the first URLLC packet (e.g., received in the third slot in FIGS. 4 and 5). In certain aspects, the PI may indicate a resource index associated with a reduced transmission power by the at least one second UE. In certain other aspects, the resource index may include one or more resources in a second slot (e.g., the third slot in FIGS. 4 and 5). In certain other configurations, the apparatus 1002/1002' for wireless communication may include means for receiving the first URLLC packet (e.g., the URLLC packet received in the third slot in FIGS. 4 and 5) on the one or more resources in the second slot (e.g., the third slot in FIGS. 4 and 5). In certain other configurations, the apparatus 1002/1002' for wireless communication may include means for receive a multi-user transmission from the first UE (e.g., the URLLC UE 402, 502) and the one or more second UEs (e.g., the at least one eMBB UE 406, 506). In certain aspects, the multi-user transmission may include the first URLLC packet from the first UE and at least one eMBB packet from the at least one second UE. In certain other aspects, the at least one eMBB packet may be received with a reduced transmission power as compared to a different multi-user transmission that does not include the first URLLC packet.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. A method of wireless communication of a user equipment (UE), comprising:
monitoring a single preconfigured mini-slot in each of a plurality of slots for a preemption indicator (PI);
receiving the PI in the single preconfigured mini-slot of a first slot of the plurality of slots, the PI including a resource index associated with a reduced transmission power by the UE, the resource index including one or more resources in a second slot;
decoding the PI received in the single preconfigured mini-slot of the first slot of the plurality of slots to obtain the resource index associated with the reduced transmission power;
performing power reduction of at least one packet upon obtaining the resource index associated with the reduced transmission power from the decoding of the PI; and
transmitting the at least one packet with the reduced transmission power on the one or more resources in the second slot or refraining from transmitting the at least one packet on the one or more resources in the second slot.

2. The method of claim 1, wherein a first time period associated with the decoding the PI and the performing the power reduction is less than an entire slot duration.

3. The method of claim 2, further comprising:
initiating a generation of the at least one packet for transmission on the one or more resources in the second slot prior to the receiving the PI in the single preconfigured mini-slot of the first slot,
wherein a second time period associated with the generation of the at least one packet is longer than the first time period associated with the decoding the PI and the performing the power reduction, and
wherein the generation of the at least one packet is initiated in a third slot that is located before the first slot and the second slot in a time domain.

4. The method of claim 1, wherein the reduced transmission power is preconfigured at the UE.

5. The method of claim 1, wherein the plurality of slots are associated with a frequency division duplex (FDD) configuration.

6. The method of claim 1, wherein the plurality of slots are associated with a time division duplex (TDD) configuration.

7. The method of claim 1, wherein the UE remains in a non-monitoring state in all mini-slots other than the single preconfigured mini-slot in each of the plurality of slots.

8. A method of wireless communication of a base station, comprising:
receiving information from a first user equipment (UE) indicating the first UE will transmit a first ultra-reliable low latency communication (URLLC) packet;
transmitting a preemption indicator (PI) in a single preconfigured mini-slot in a first slot to at least one second UE for the first URLLC packet, the PI indicating a resource index associated with a reduced transmission power by the at least one second UE, the resource index including one or more resources in a second slot; and
receiving a multi-user transmission from the first UE and the at least one second UE,
wherein the multi-user transmission includes the first URLLC packet from the first UE and at least one enhanced mobile broadband (eMBB) packet from the at least one second UE, and
wherein the at least one eMBB packet is received with the reduced transmission power as compared to a different multi-user transmission that does not include the first URLLC packet.

9. The method of claim 8, wherein the information includes a URLLC request indicating that the first URLLC packet will be transmitted by the first UE.

10. The method of claim 8, further comprising:
receiving the first URLLC packet on the one or more resources in the second slot,
wherein the information is a second URLLC packet received prior to receiving the first URLLC packet from the first UE.

11. An apparatus for wireless communication of a user equipment (UE), comprising:
a memory; and
at least one processor coupled to the memory and configured to:
monitor a single preconfigured mini-slot in each of a plurality of slots for a preemption indicator (PI);
receive the PI in the single preconfigured mini-slot of a first slot of the plurality of slots, the PI including a resource index associated with a reduced transmission power, the resource index including one or more resources in a second slot;
decode the PI received in the single preconfigured mini-slot of the first slot of the plurality of slots to obtain the resource index associated with the reduced transmission power; and
perform power reduction of at least one packet upon obtaining the resource index associated with the reduced transmission power from the decoding of the PI; and
transmit the at least one packet with the reduced transmission power on the one or more resources in the second slot or refrain from transmitting the at least one packet on the one or more resources in the second slot.

12. The apparatus of claim 11, wherein a first time period associated with the decoding the PI and the performing the power reduction is less than an entire slot duration.

13. The apparatus of claim 12, wherein the at least one processor is further configured to:
initiate a generation of the at least one packet for transmission on the one or more resources in the second slot prior to receiving the PI in the single preconfigured mini-slot of the first slot,
wherein a second time period associated with the generation of the at least one packet is longer than the first time period associated with the decode of the PI and the performance of the power reduction, and
wherein the generation of the at least one packet is initiated in a third slot that is located before the first slot and the second slot in a time domain.

14. The apparatus of claim 11, wherein the reduced transmission power is preconfigured at the apparatus.

15. The apparatus of claim 11, wherein the plurality of slots are associated with a frequency division duplex (FDD) configuration.

16. The apparatus of claim 11, wherein the plurality of slots are associated with a time division duplex (TDD) configuration.

17. The apparatus of claim 11, wherein the apparatus remains in a non-monitoring state in all mini-slots other than the single preconfigured mini-slot in each of the plurality of slots.

18. An apparatus for wireless communication of a base station, comprising:
a memory; and
at least one processor coupled to the memory and configured to:
receive information from a first user equipment (UE) indicating the first UE will transmit a first ultra-reliable low latency communication (URLLC) packet;
transmit a preemption indicator (PI) in a single preconfigured mini-slot in a first slot to at least one second UE for the first URLLC packet, the PI indicating a resource index associated with a reduced transmission power by the at least one second UE, the resource index including one or more resources in a second slot; and
receive a multi-user transmission from the first UE and the at least one second UE,
wherein the multi-user transmission includes the first URLLC packet from the first UE and at least one enhanced mobile broadband (eMBB) packet from the at least one second UE, and wherein the at least one eMBB packet is received with the reduced transmission power as compared to a different multi-user transmission that does not include the first URLLC packet.

19. The apparatus of claim 18, wherein the information includes a URLLC request indicating that the first URLLC packet will be transmitted by the first UE.

20. The apparatus of claim 18, wherein the at least one processor is further configured to:
    receive the first URLLC packet on the one or more resources in the second slot,
    wherein the information is a second URLLC packet received prior to receiving the first URLLC packet from the first UE.

\* \* \* \* \*